United States Patent
Mukaiyama

(10) Patent No.: US 9,667,812 B2
(45) Date of Patent: May 30, 2017

(54) IMAGE READING DEVICE AND CORRECTION METHOD FOR IMAGE READING DEVICE

(71) Applicant: KONICA MINOLTA, INC., Chiyoda-ku (JP)

(72) Inventor: Takashi Mukaiyama, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 5 days.

(21) Appl. No.: 14/784,891

(22) PCT Filed: Apr. 15, 2014

(86) PCT No.: PCT/JP2014/060727
§ 371 (c)(1),
(2) Date: Oct. 15, 2015

(87) PCT Pub. No.: WO2014/171456
PCT Pub. Date: Oct. 23, 2014

(65) Prior Publication Data
US 2016/0080583 A1    Mar. 17, 2016

(30) Foreign Application Priority Data

Apr. 17, 2013    (JP) ................................ 2013-086399

(51) Int. Cl.
*H04N 1/60* (2006.01)
*H04N 1/46* (2006.01)
(Continued)

(52) U.S. Cl.
CPC ....... *H04N 1/00023* (2013.01); *H04N 1/0032* (2013.01); *H04N 1/00344* (2013.01);
(Continued)

(58) Field of Classification Search
None
See application file for complete search history.

(56) References Cited

U.S. PATENT DOCUMENTS 5,754,683 A * 5/1998 Hayashi ............... H04N 1/6033
358/504
5,889,928 A * 3/1999 Nakamura ........... H04N 1/4078
358/1.9

(Continued)

FOREIGN PATENT DOCUMENTS

EP    0769869    4/1997
EP    2566148    3/2013

(Continued)

OTHER PUBLICATIONS

Search Report dated Jan. 25, 2017 which issued in the corresponding European Patent Application No. 14784859.2.

Primary Examiner — Madelein Nguyen
(74) Attorney, Agent, or Firm — Cozen O'Connor

(57) ABSTRACT

An image forming apparatus 1 includes: a conveyance unit 40 that conveys a medium; a reading unit 50 that reads an image formed on the medium conveyed by the conveyance unit; a storage unit that stores data for specifying a color indicated by a reading result obtained from the reading unit 50; and a correction unit that corrects the data to match a color of the image and the color indicated by the reading result. The conveyance unit 40 conveys a color sample medium. Sa as a medium containing an image of a color region of a predetermined color, the reading unit 50 reads the image of the color region, and the correction unit corrects the data associated with the predetermined color in accordance with a reading result of the image of the color region obtained from the reading unit 50.

16 Claims, 15 Drawing Sheets

(51) Int. Cl.
  *G03F 3/08* (2006.01)
  *G06K 9/00* (2006.01)
  *H04N 1/00* (2006.01)
  *H04N 1/401* (2006.01)
  *H04N 1/407* (2006.01)

(52) U.S. Cl.
  CPC ......... *H04N 1/00819* (2013.01); *H04N 1/401* (2013.01); *H04N 1/4078* (2013.01); *H04N 1/60* (2013.01); *H04N 1/6044* (2013.01); *H04N 2201/0081* (2013.01)

(56) References Cited

U.S. PATENT DOCUMENTS

| | | | | |
|---|---|---|---|---|
| 6,148,158 | A * | 11/2000 | Amemiya | G03G 15/01 358/519 |
| 6,690,490 | B1 * | 2/2004 | Murakami | H04N 1/4078 358/1.9 |
| 8,179,576 | B2 * | 5/2012 | Hayashi | H04N 1/6033 358/1.9 |
| 8,488,188 | B2 * | 7/2013 | Nomura | G03G 15/5062 358/1.18 |
| 8,531,745 | B2 * | 9/2013 | Oki | G03G 15/011 358/1.9 |
| 8,743,437 | B2 * | 6/2014 | Ikeda | H04N 1/6033 358/518 |
| 8,848,255 | B2 * | 9/2014 | Sakatani | G06K 15/129 358/1.9 |
| 8,964,246 | B2 * | 2/2015 | Sakatani | G03G 15/0131 345/590 |
| 2005/0030562 | A1 * | 2/2005 | Hama | G03G 15/5058 358/1.9 |
| 2005/0280868 | A1 * | 12/2005 | Kamon | H04N 1/4074 358/3.01 |
| 2006/0061836 | A1 * | 3/2006 | Maruchi | H04N 1/00002 358/483 |
| 2006/0227397 | A1 * | 10/2006 | Goma | G03B 27/72 358/521 |
| 2007/0071460 | A1 * | 3/2007 | Chizawa | G03G 15/6564 399/13 |
| 2007/0188784 | A1 * | 8/2007 | Nishioka | H04N 1/00002 358/1.9 |
| 2007/0189605 | A1 * | 8/2007 | Nishioka | H04N 1/40037 382/176 |
| 2007/0285743 | A1 * | 12/2007 | Hirayama | H04N 1/6027 358/504 |
| 2008/0231649 | A1 * | 9/2008 | Kawabata | B41J 2/17509 347/14 |
| 2008/0252677 | A1 * | 10/2008 | Tajika | B41J 11/42 347/16 |
| 2009/0034001 | A1 | 2/2009 | Shiraishi et al. | |
| 2009/0116083 | A1 * | 5/2009 | Yoshizawa | H04N 1/6033 358/505 |
| 2009/0316166 | A1 * | 12/2009 | Kubo | H04N 1/4097 358/1.9 |
| 2010/0207983 | A1 * | 8/2010 | Sasayama | B41J 29/393 347/14 |
| 2010/0214347 | A1 * | 8/2010 | Sasayama | B41J 29/393 347/19 |
| 2012/0081441 | A1 * | 4/2012 | Miyake | G06K 9/03 347/15 |
| 2012/0154472 | A1 * | 6/2012 | Sakamoto | B41J 11/007 347/16 |
| 2012/0206746 | A1 * | 8/2012 | Sakatani | H04N 1/60 358/1.9 |
| 2013/0050722 | A1 * | 2/2013 | Kujirai | H04N 1/46 358/1.9 |
| 2013/0100193 | A1 * | 4/2013 | Hoshi | B41J 2/2142 347/16 |
| 2013/0194327 | A1 * | 8/2013 | Hara | B41J 2/195 347/7 |
| 2016/0039217 | A1 * | 2/2016 | Takagi | H04N 1/4015 347/15 |
| 2016/0062296 | A1 * | 3/2016 | Nakamura | G03G 15/6558 399/15 |
| 2016/0063361 | A1 * | 3/2016 | Hayashi | G06K 15/129 399/39 |

FOREIGN PATENT DOCUMENTS

| | | |
|---|---|---|
| JP | 06-350849 | 12/1994 |
| JP | 2006-229466 | 8/2006 |
| JP | 2007-215076 | 8/2007 |
| JP | 2010-085828 | 4/2010 |
| JP | 2013-46967 | 3/2013 |
| JP | 2013-55601 | 3/2013 |
| JP | 2013-56468 | 3/2013 |

* cited by examiner

FIG. 3A

| STANDARD DATA | | | | | |
|---|---|---|---|---|---|
| IMAGE PICKUP DEVICE | COLOR | LUMINANCE | | | BRIGHTNESS |
| | | R | G | B | |
| x | WHITE | 255 | 255 | 255 | 255 |
| | BLACK | 0 | 0 | 0 | 0 |
| | ⋮ | ⋮ | ⋮ | ⋮ | ⋮ |
| x+1 | WHITE | 255 | 255 | 255 | 255 |
| | BLACK | 0 | 0 | 0 | 0 |
| | ⋮ | ⋮ | ⋮ | ⋮ | ⋮ |
| ⋮ | ⋮ | ⋮ | ⋮ | ⋮ | ⋮ |

FIG. 3B

| CONDITION DATA | | | |
|---|---|---|---|
| IMAGE PICKUP DEVICE | SENSITIVITY | LIGHT EMISSION ELEMENT | INTENSITY |
| x | xxa | y | yya |
| x+1 | xxb | y+1 | yyb |
| ⋮ | ⋮ | ⋮ | ⋮ |

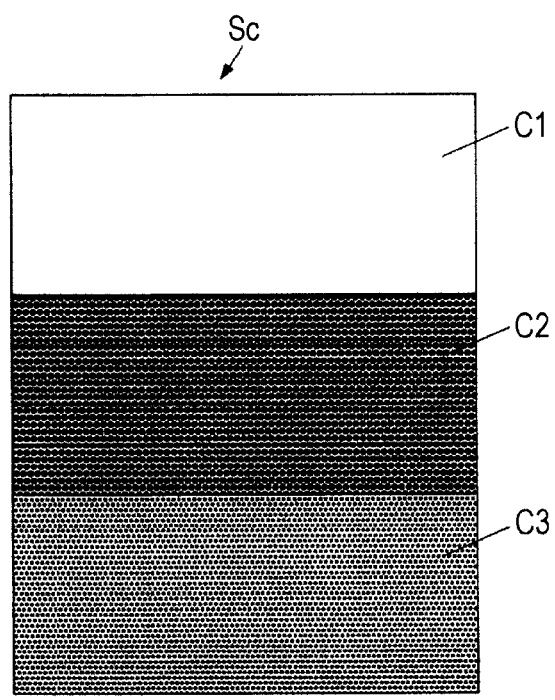

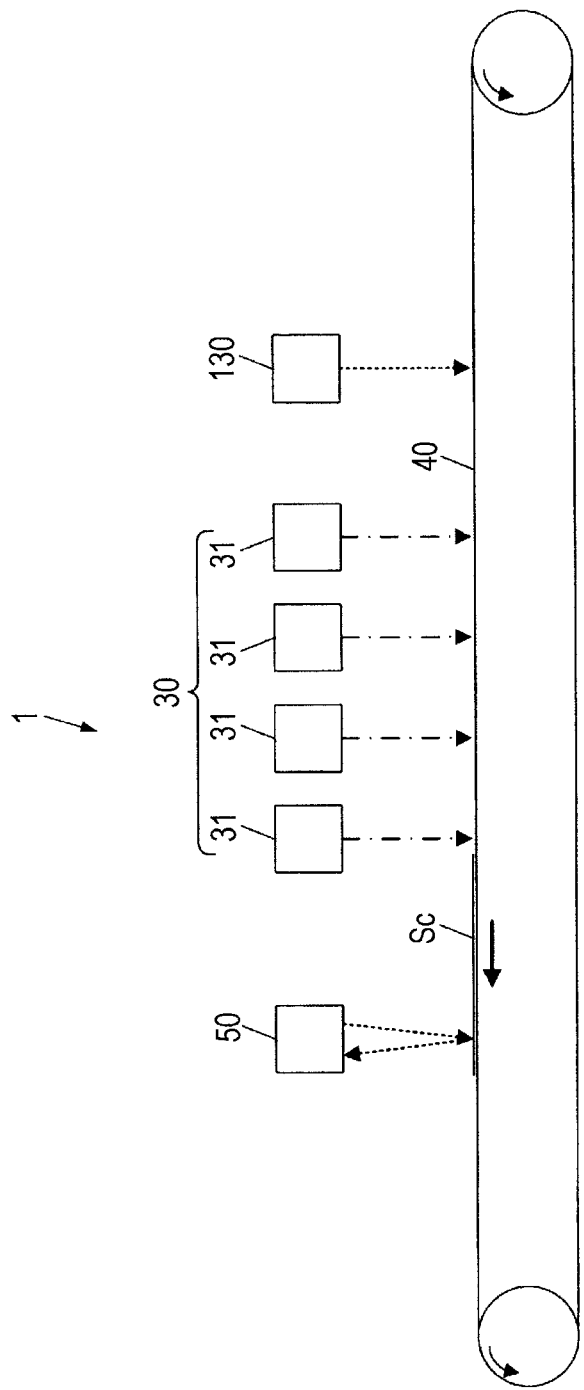

FIG. 13

| GRADATION PATTERN VALUE | CORRECTION IMAGE DATA | | | | | | | | | |
|---|---|---|---|---|---|---|---|---|---|---|
| 255 | 255 | 255 | 255 | 255 | 255 | 255 | 255 | 255 | 255 | ... |
| ⋮ | ⋮ | ⋮ | ⋮ | ⋮ | ⋮ | ⋮ | ⋮ | ⋮ | ⋮ | |
| 127 | 127 | 127 | 127 | 127 | 127 | 127 | 127 | 127 | 128 | ... |
| ⋮ | ⋮ | ⋮ | ⋮ | ⋮ | ⋮ | ⋮ | ⋮ | ⋮ | ⋮ | |
| 0 | 0 | 0 | 0 | 0 | 0 | 0 | 0 | 0 | 0 | ... |
| IMAGE PICKUP DEVICE | x | x+1 | x+2 | x+3 | x+4 | x+5 | x+6 | x+7 | x+8 | ... |

FIG. 14

| GRADATION PATTERN VALUE | SPECIFIED PIXEL | | | | | | | | | |
|---|---|---|---|---|---|---|---|---|---|---|
| 255 | 255 | | | | | | | | 255 | ... |
| ⋮ | ⋮ | | | | | | | | ⋮ | |
| 127 | 127 | | | | | | | | 128 | ... |
| ⋮ | ⋮ | | | | | | | | ⋮ | |
| 0 | 0 | | | | | | | | 0 | ... |
| IMAGE PICKUP DEVICE | x | x+1 | x+2 | x+3 | x+4 | x+5 | x+6 | x+7 | x+8 | ... |

IMAGE READING DEVICE AND CORRECTION METHOD FOR IMAGE READING DEVICE

RELATED APPLICATIONS

This is a U.S. National stage of International application No. PCT/JP2014/060727 filed on Apr. 15, 2014.

This patent application claims the priority of Japanese application no. 2013-086399 filed Apr. 17, 2013, the disclosure content of which is hereby incorporated by reference.

TECHNICAL FIELD

The present invention relates to an image reading device and a correction method for an image reading device.

BACKGROUND ART

An image reading device, such as an image scanner, has a correction process (calibration) function for correcting a correlation between output from a reading unit and a color indicated by this output based on a color sample so as to properly recognize a color of an image formed on a medium and read by the reading unit (for example, refer to Patent Literature 1). Generally, a component functioning as a color sample is provided at a position facing the reading unit as equipment fixed to the image reading device. In the correction process, the image reading device reads the color sample by using the reading unit, and associates a value indicated by a signal output as a reading result with a color of the color sample to determine a color standard.

CITATION LIST

Patent Literature

Patent Literature 1: JP 6-350849 A

SUMMARY OF INVENTION

Technical Problem

According to a conventional image reading device, a color sample is fixed to the image reading device. In this case, aged deterioration of the color sample inevitably occurs due to fouling on the color sample or for other reasons. When deterioration of the color sample develops, the color recognition accuracy of the reading unit determined based on this color sample lowers. Accordingly, maintenance of the color sample is essential for proper correction required for the purpose of maintenance of the color recognition accuracy of the reading unit. However, maintenance and replacement of the fixed color sample are laborious and time-consuming work, as has been a conventional problem.

An object of the present invention is to provide an image reading device and a correction method for an image reading device, which are capable of correcting a reading unit more easily.

Solution to Problem

An image reading device according to claim 1 of the invention includes: a conveyance unit that conveys a medium; a reading unit that reads an image formed on the medium conveyed by the conveyance unit; a storage unit that stores data for specifying a color indicated by a reading result obtained from the reading unit; and a correction unit that corrects the data to match a color of the image and the color indicated by the reading result. The image reading device is characterized in that the conveyance unit conveys a color sample medium as a medium containing an image of a color region of a predetermined color, that the reading unit reads the image of the color region, and that the correction unit corrects the data associated with the predetermined color in accordance with a reading result of the image of the color region obtained from the reading unit.

An invention according to claim 2 is the image reading device according to claim 1, characterized in that the color sample medium contains images of the color regions of a plurality of colors, and that the correction unit corrects the data associated with the plurality of colors in accordance with reading results of the images of the color regions of the plurality of colors obtained from the reading unit.

An invention according to claim 3 is the image reading device according to claim 2, further including a determination unit that determines reading timing for the respective images of the color regions of the plurality of colors contained in the color sample medium conveyed by the conveyance unit. The image reading device is characterized in that the reading unit reads the respective images of the color regions of the plurality of colors in accordance with the reading timing determined by the determination unit.

An invention according to claim 4 is the image reading device according to claim 3, characterized in that the determination unit determines the reading timing in accordance with a conveyance amount of the color sample medium from a predetermined position on the upstream side of the reading unit in a conveyance direction of the medium conveyed by the conveyance unit.

An invention according to claim 5 is the image reading device according to any one of claims 2 to 4, characterized in that the images of the color regions of the plurality of colors are formed on both surfaces of the color sample medium, and that the conveyance unit includes a both-surface conveyance mechanism that conveys the medium such that the reading unit reads both the surfaces of the medium.

An invention according to claim 6 is the image reading device according to any one of claims 1 to 5, including a standby unit that puts the color sample medium on standby before the color sample medium is conveyed by the conveyance unit. The image reading device is characterized in that the conveyance unit conveys the color sample medium from the standby unit.

An invention according to claim 7 is the image reading device according to any one of claims 1 to 6, including an evacuation unit that evacuates the color sample medium conveyed by the conveyance unit. The image reading device is characterized in that the conveyance unit conveys the color sample medium read by the reading unit such that the color sample medium evacuates toward the evacuation unit.

An invention according to claim 8 is the image reading device according to any one of claims 1 to 7, characterized in that the reading unit includes a predetermined number of three or more image pickup devices provided in a predetermined direction, and the storage unit stores reference data for each of a plurality of representative image pickup devices of a number smaller than the predetermined number of the image pickup devices, as representative image pickup devices selected from the predetermined number of image pickup devices, the reference data containing a plurality of reference values set individually as values selected within a range of a predetermined number of gradations from a minimum color value to a maximum color value and corresponding to a plurality of representative color values of a number smaller than the predetermined number of gradations. The correction unit includes a first specification means that specifies an image pickup device corresponding to a correction target in the predetermined number of image pickup devices, a second specification means that specifies a representative image pickup device corresponding to the image pickup device specified by the first specification means, a third specification means that specifies a representative color value corresponding to a color value indicated by a reading result obtained from the image pickup device specified by the first specification means, an acquisition means that acquires, from the storage unit, reference values corresponding to a combination of the representative image pickup device specified by the second specification means and the representative color value specified by the third specification means, and a calculation means that calculates a correction value corresponding to a value indicated by the reading result obtained from the image pickup device specified by the first specification means in an interpolation process based on the reference values acquired by the acquisition means.

An invention according to claim 9 is the image reading device according to claim 8, characterized in that the second specification means specifies one representative image pickup device corresponding to the image pickup device specified by the first specification means when the image pickup device specified by the first specification means corresponds to any one of the plurality of representative image pickup devices, and specifies two representative image pickup devices close to the image pickup device specified by the first specification means when the image pickup device specified by the first specification means does not correspond to any one of the plurality of representative image pickup devices, and that the third specification means specifies one representative color value corresponding to the color value indicated by a reading result obtained from the image pickup device specified by the first specification means when the color value indicated by this reading result corresponds to any one of the plurality of representative color values, and specifies two representative color values close to the color value indicated by the reading result obtained from the image pickup device specified by the first specification means when the color value indicated by this reading result does not correspond to any one of the representative color values.

An invention according to claim 10 is the image reading device according to claim 8 or 9, characterized in that the plurality of reference values are set based on values indicated by reading results obtained from the plurality of representative image pickup devices having read a color sample corresponding to the plurality of representative color values of the predetermined color.

An invention according to claim 11 is the image reading device according to any one of claims 1 to 10, characterized in that the color sample medium has a thickness sufficient for preventing such a state that the other surface of the color sample medium is seen through one surface of the color sample read by the reading unit.

An invention according to claim 12 is a correction method for an image reading device which includes a conveyance unit that conveys a medium, a reading unit that reads an image formed on the medium conveyed by the conveyance unit, a storage unit that stores data for specifying a color indicated by a reading result obtained from the reading unit, and a correction unit that corrects the data to match a color of the image and the color indicated by the reading result. The method is characterized by including: a step of allowing the conveyance unit to convey a color sample medium as a medium containing an image of a color region of a predetermined color; a step of allowing the reading unit to read the image of the color region; and a step of allowing the correction unit to correct the data associated with the predetermined color in accordance with a reading result of the image of the color region obtained from the reading unit.

Advantageous Effects of Invention

According to the present invention, a reading unit is more easily correctable.

BRIEF DESCRIPTION OF DRAWINGS

FIG. 3A is a view illustrating an example of standard data described in a storage unit.

FIG. 3B is a view illustrating an example of condition data described in the storage unit.

FIG. 7 is a view illustrating an example of a color sample medium which contains images of color regions of a plurality of colors disposed on one surface of a color sample medium.

FIG. 8 is a view illustrating an example of the image forming apparatus which further includes a determination unit.

FIG. 13 is a view illustrating an example of correction image data.

FIG. 14 is a view illustrating an example of specification of pixels which correspond to a gradation pattern read by image pickup devices determined as representative image pickup devices, and correspond to representative color values.

DESCRIPTION OF EMBODIMENTS

An embodiment according to the present invention is hereinafter described with reference to the drawings. While the embodiment described herein includes various limitations considered preferable for carrying out the present invention in technical views, the scope of the invention is not limited to the following embodiment and examples illustrated in the respective figures.

Figure 1:
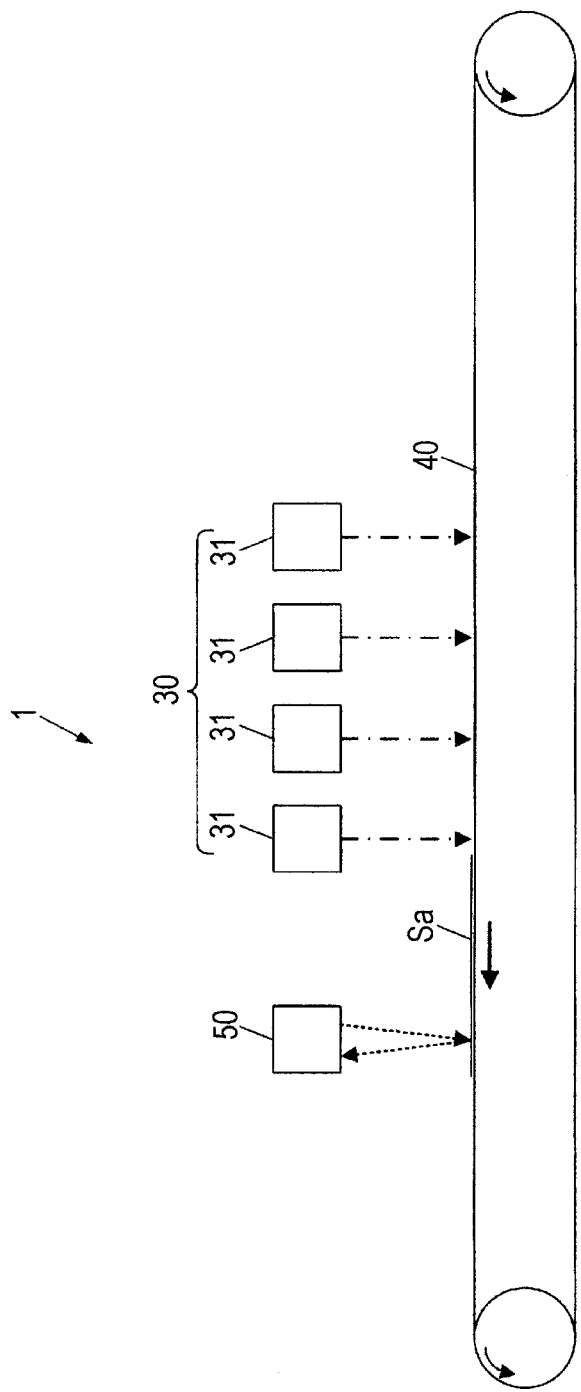
FIG. 1 is a view illustrating a chief configuration of an image forming apparatus according to an embodiment of the present invention, including an image reading device according to the present invention.

FIG. 1 is a view illustrating a chief configuration of an image forming apparatus 1 according to an embodiment of the present invention, which functions as an image reading device according to the present invention.

Figure 2:
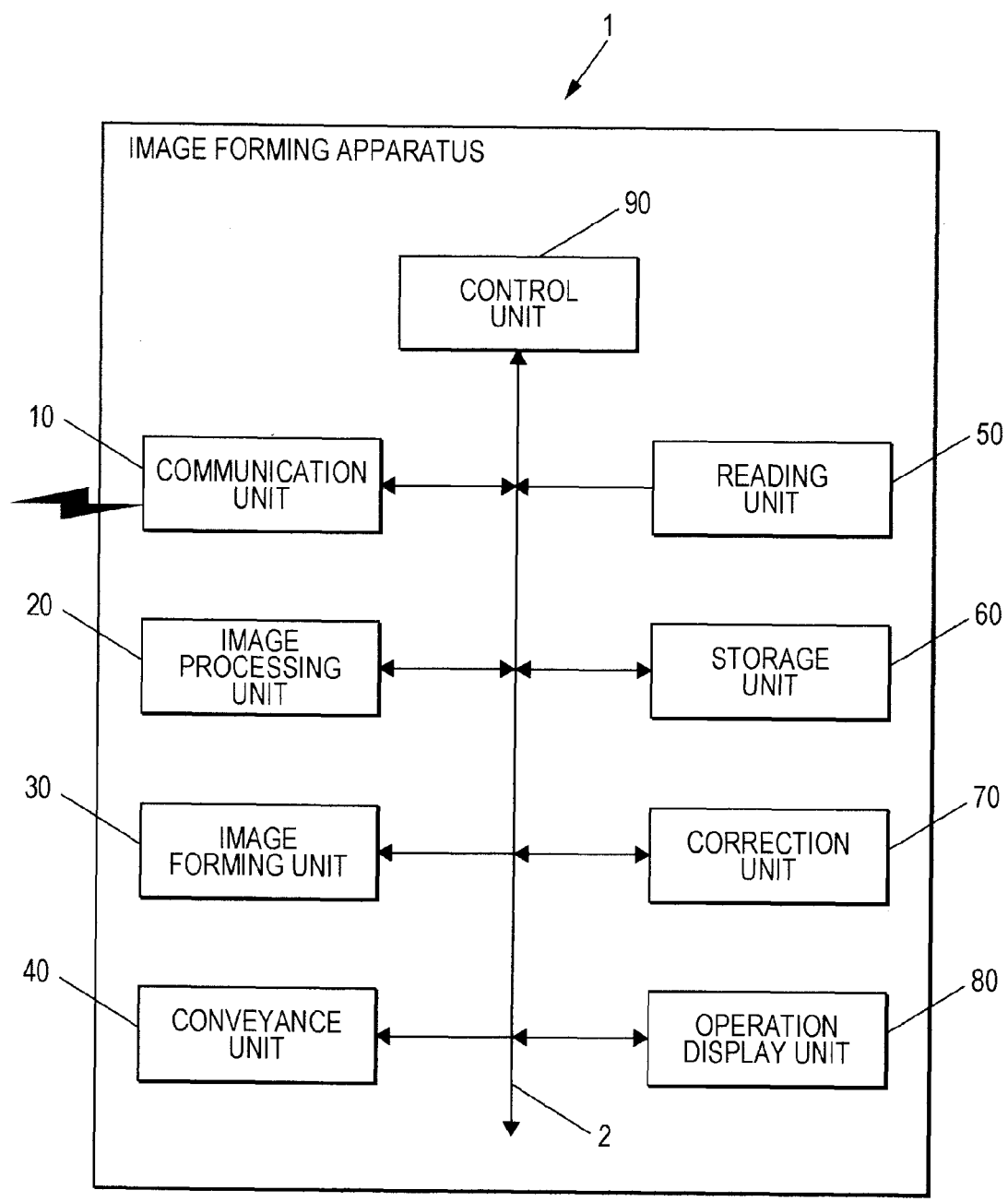
FIG. 2 is a block diagram illustrating a chief configuration of the image forming apparatus.

FIG. 2 is a block diagram illustrating the chief configuration of the image forming apparatus 1.

The image forming apparatus 1 includes a communication unit 10, an image processing unit 20, an image forming unit 30, a conveyance unit 40, a reading unit 50, a storage unit 60, a correction unit 70, an operation display unit 80, a control unit 90, and others. These units are connected with each other via a bus 2.

The communication unit 10 includes a network interface card (Network Interface Card) and the like, for example, to connect a not-shown external device and the image forming apparatus 1 in such a manner that the external device and the image forming apparatus 1 can communicate with each other.

The communication unit 10 receives job data transmitted from the external device, for example.

The image processing unit 20 performs various types of image processing.

More specifically, the image processing unit 20 performs various types of image processes, such as an analysis process for analyzing data contained in job data input via the communication unit 10 and described in a page description language to generate vector data, and a rasterization process for generating bitmap data corresponding to image data from the vector data generated by the analysis process.

The image forming unit 30 forms an image on a recording medium.

More specifically, the image forming unit 30 includes head units 31 each of which contains a plurality of nozzles disposed in a predetermined direction, an inkjet head which ejects ink from each of the plurality of nozzles, a driving board provided with various types of circuits associated with driving of the inkjet head, and others, for example. The image forming unit 30 further includes an ink supply unit which supplies ink to the head units 31, for example. The image forming unit 30 ejects ink from the nozzles of the head units 31 to a recording medium conveyed by the conveyance unit 40 to form an image on the recording medium.

The image forming unit 30 according to this embodiment is an image forming unit capable of performing color printing for forming an image by using a combination of ink in a plurality of colors. The head units 31 of the image forming unit 30 are provided separately for each of the plurality of colors.

The conveyance unit 40 conveys a medium.

More specifically, the conveyance unit 40 includes a ring-shaped belt having a predetermined width in a predetermined direction, a plurality of rollers disposed inside the ring of the belt such that the belt wound around the rollers extends between the rollers, and a driving unit for rotating the rollers, for example. The conveyance unit 40 rotates the rollers using the driving unit to convey a medium such as a recording medium carried on an outer circumferential surface of the belt.

The conveyance unit 40 conveys the medium in a direction perpendicular to the predetermined direction, for example. A conveyance surface of the conveyance unit 40 on which the medium is carried, and an ejection direction of ink ejected from the nozzles of the head units 31 of the image forming unit 30 cross each other at right angles.

The conveyance unit 40 further conveys a color sample medium (such as color sample medium Sa) which corresponds to a medium containing an image of a color region of a predetermined color.

More specifically, in a correction process which matches a color of an image formed on a medium read by the reading unit 50 with a color indicated by a reading result obtained from the reading unit 50, the conveyance unit 40 conveys the color sample medium Sa containing an image of a color region of a color corresponding to a target for the correction process.

The reading unit 50 reads an image formed on a medium conveyed by the conveyance unit 40.

More specifically, the reading unit 50 includes a generation unit which generates image data in accordance with electric signals output from a linear image sensor containing a predetermined number of three or more image pickup devices arranged in a predetermined direction, such as a CCD (charge-coupled device) image sensor and a CMOS (Complementary Metal Oxide Semiconductor) image sensor, or output from an image pickup device, for example. The reading unit 50 further includes a light source which applies light to the medium. The reading unit 50 reads an image formed on the medium by scanning the medium conveyed by the conveyance unit 40 and thus moved with respect to the reading unit 50. More specifically, the reading unit 50 applies light from the light source to the medium, and detects the light reflected on the medium by using the linear image sensor to generate and output image data based on an electric signal output in accordance with a detection result.

The reading unit 50 according to this embodiment is disposed on the downstream side of the image forming unit 30 in the conveyance direction of the medium conveyed by the conveyance unit 40, and reads an image formed on the medium.

In the correction process, the reading unit 50 reads the color sample medium Sa, and generates and outputs image data corresponding to a reading result.

The storage unit 60 stores data for specifying a color of an image formed on the medium read by the reading unit 50.

More specifically, the storage unit 60 includes a non-volatile storage device provided in a rewritable manner, such as a flash memory, for example. The storage unit 60 stores various types of data associated with operation of the reading unit 50, such as standard data for specifying a color indicated by an electric signal output from the reading unit 50 in association with generation of image data, and condition data indicating operation conditions of the reading unit 50 associated with specification of a color based on this standard data, for example.

As illustrated in FIG. 3A, the standard data indicates a correlation between color values and brightness of R, G, and B detected by each of the predetermined number of image pickup devices constituting the linear image sensor of the reading unit 50, and colors indicated by the color values and brightness, for example. The color values in this context refer to respective luminance of primary colors (such as R, G, and B) constituting a color of an image read by the reading unit 50, for example. However, the color values are not limited to the values presented herein only by way of example, but may be arbitrary values capable of representing colors.

As illustrated in FIG. 3B, the condition data indicates various types of operation conditions for operating the reading unit 50 such that all the predetermined number of image pickup devices constituting the linear image sensor of the reading unit 50 can detect colors based on the correlation defined by the standard data between the color values and brightness and the corresponding colors, for example. Examples of the various types of operation conditions include respective sensitivities of the image pickup devices, and light amounts of a plurality of light emission elements constituting the light source. However, the conditions are not limited to these conditions presented only by way of example, but may include data indicating conditions associated with operations of respective configurations contained in the reading unit 50 and concerning detection of colors by the reading unit 50.

Image pickup devices "x" and "x+1" in the standard data and the condition data illustrated in FIGS. 3A and 3B correspond to the predetermined number of image pickup devices constituting the image sensor of the reading unit 50, respectively. On the other hand, light sources "y" and "y+1" correspond to the plurality of light emission elements constituting the light source, respectively. Values indicating sensitivities of the respective image pickup devices are set for sensitivities "xxa" and "xxb", and values indicating intensities of lights of the light emission elements are set for intensities "yya" and "yyb".

The correction unit 70 corrects data stored in the storage unit 60 to match the color of the image formed on the medium read by the reading unit 50 with the color indicated by the reading result obtained from the reading unit 50. The correction unit 70 is constituted by an integrated circuit such as an FPGA (field-programmable gate array) and ASIC (application specific integrated circuit). This integrated circuit is configured to perform functions for correcting data stored in the storage unit 60.

The operation display unit 80 outputs various types of display associated with operations of the image forming apparatus 1, and detects various types of input operations associated with the operations of the image forming apparatus 1.

More specifically, the operation display unit 80 includes a display device provided with a touch panel type input device, switches provided in correspondence with various types of input operation contents, and others. The operation display unit 80 outputs various types of display associated with operations of the image forming apparatus 1 under control of the control unit 90 by the display device. The operation display unit 80 further detects operations input from a user to the touch panel type input device or the switches, and outputs signals corresponding to the detected input operation contents to the control unit 90.

The control unit 90 executes various types of processes associated with control of the operations of the image forming apparatus 1.

More specifically, the control unit 90 includes a CPU, a RAM, a ROM and others, for example. The CPU reads programs and data corresponding to processing contents from the storage device such as the ROM, and processes the read programs and data to control operations of the respective units of the image forming apparatus 1. The CPU further stores, in the RAM, programs and data read at the time of processing, and parameters and the like generated at the time processing.

The image forming apparatus 1 according to this embodiment forms an image on a recording medium by using the image forming unit 30, and performs a checking function for checking the image formed on the recording medium and read by the reading unit 50.

More specifically, when a user inputs an instruction for using the checking function via the operation display unit 80, for example, the control unit 90 operates the conveyance unit 40 to convey a recording medium, and operates the image forming apparatus 1 to form a predetermined image on the recording medium. The predetermined image in this context is an image or the like prepared beforehand for checking ejection patterns of ink supplied from the plurality of nozzles of the respective head units 31. The control unit 90 further operates the reading unit 50 to allow the reading unit 50 to read the predetermined image during passage of the recording medium containing the image below the reading unit 50. Then, the control unit 90 displays image data on the operation display unit 80 or an external computer or the like connected via the communication unit 10, as the image data generated based on reading by the reading unit 50. This display of the image data allows more detailed checking of a state of image formation difficult to be checked only by visual checking of the recording medium, such as a more detailed state of ejection of ink from the respective nozzles toward the recording medium at the time of image formation.

The image forming apparatus 1 according to this embodiment further has a function for correcting data stored in the storage unit 60 to match a color of an image formed on a medium read by the reading unit 50 with a color indicated by a reading result obtained from the reading unit 50.

More specifically, when the user sets the color sample medium Sa on the conveyance unit 40, and inputs an instruction for using the correction function via the operation display unit 80, the control unit 90 starts operation of the respective units associated with the correction process.

The correction process is hereinafter described.

In the correction process, the conveyance unit 40 conveys the color sample medium Sa containing an image of a color region of a predetermined color, while allowing the reading unit 50 to read the color sample medium Sa. At this time, the image forming unit 30 does not operate.

The color sample medium Sa is now detailed.

The color sample medium Sa contains a color region formed such that all the image pickup devices constituting the linear image sensor of the reading unit 50 indicate such detection results as a color value of 100% (such as 255) and brightness of 100% (such as 255) for all of R, G, and B when the color sample medium Sa is read by the reading unit 50, for example. This color region is a color region corresponding to white in the RGB color space.

The color sample medium Sa has a thickness sufficient for preventing such a condition that the other surface of the color sample medium Sa is seen through one surface thereof on the side read by the reading unit 50. More specifically, the color sample medium Sa has a thickness sufficient for avoiding transmission of light having the highest intensity in lights emitted from the light source of the reading unit 50 at the time of reading by the reading unit 50, for example.

The image of the color region is not limited to the image formed throughout the one surface (front surface) of the color sample medium Sa as presented only by way of example. For example, the image of the color region may be formed on both surfaces of the color sample medium Sa. In addition, the image may be formed not throughout the surface but only in a partial area thereof. However, it is preferable that the image has a width readable by all the image pickup devices constituting the linear image sensor of the reading unit 50. When the image has a width readable by all the image pickup devices constituting the linear image sensor of the reading unit 50, the correction process associated with all the image pickup devices constituting the linear image sensor of the reading unit 50 simultaneously finishes by one conveyance of the color sample medium Sa.

At the time of reading of the color sample medium Sa containing the image of the color region discussed above, the reading unit 50 operates under the respective operation conditions defined by the condition data stored in the storage unit 60. Then, as a reading result of the color sample medium Sa, the reading unit 50 outputs electric signals indicating respective color values and values of brightness for R, G, and B detected by the respective image pickup devices constituting the linear image sensor.

The respective image pickup devices constituting the linear image sensor exhibit individual differences concerning operation as sensors, such as sensitivities. Moreover, light emissions from the plurality of light emission elements constituting the light source are not completely uniform, but may contain non-uniformity. Accordingly, in the reading result of the color sample medium Sa, there may be produced image pickup devices not indicating the detection result of the color value of 100% (such as 255), or image pickup-devices not indicating the detection result of the brightness of 100% (such as 255), for any one or a plurality of R, G, and B.

The correction unit 70 corrects data associated with a color of a color region based on a reading result of an image of the corresponding color region obtained from the reading unit 50.

More specifically, the correction unit 70 corrects condition data such that the image pickup devices not indicating the detection result of the color value of 100% (such as 255), or the image pickup devices not indicating the detection result of the brightness of 100% (such as 255) for any one or a plurality of R, G, and B can indicate detection results of the color value of 100% (such as 255) and the brightness of 100% (such as 255) for all R, G, and B. More specifically, the correction unit 70 corrects condition data to change sensitivities of the respective image pickup devices, for example. Moreover, the correction unit 70 corrects condition data to change intensities of respective lights of the plurality of light emission elements (such as LEDs) constituting the light source.

For example, in the correction process, the correction unit 70 lowers an excessively high sensitivity of an image pickup device, and raises an excessively low sensitivity of an image pickup device based on the reading result output from the linear image sensor of the reading unit 50 after a start of reading of the color sample medium Sa conveyed by the conveyance unit 40 to correct condition data during the progress of the correction process in such a manner as to lower the light intensity of the light source corresponding to the image pickup device having excessively high brightness, and raise the light intensity of the light source corresponding to the image pickup device having excessively low brightness. After correction of the condition data, the reading unit 50 operates in accordance with the corrected condition data. The correction unit 70 and the reading unit 50 repeat these operations during the progress of the correction process until all the image pickup devices constituting the linear image sensor of the reading unit 50 indicate detection results of the color value of 100% (such as 255) and the brightness of 100% (such as 255) for all of R, G, and B.

When all the image pickup devices constituting the linear image sensor of the reading unit 50 indicate the detection results of the color value of 100% (such as 255) and the brightness of 100% (such as 255) for all of R, G, and B in the foregoing example, it is considered that the reading unit 50 properly recognizes the color corresponding to the color region of the color sample medium Sa (white in this example).

After such a condition that the reading unit 50 properly recognizes the color corresponding to the color region of the color sample medium Sa is realized based on the correction of the condition data made by the correction unit 70, the control unit 90 may allow the operation display unit 80 to display a notification about this condition. When the condition that the reading unit 50 properly recognizes the color corresponding to the color region of the color sample medium Sa is not realized based on the correction process executed once, the control unit 90 may allow the operation display unit 80 to display a notification urging the user to again perform the correction process.

According to the image forming apparatus 1 in this embodiment, the conveyance unit 40 conveys the color sample medium Sa which corresponds to a medium containing an image of a color region of a predetermined color. In this case, maintenance of the color sample medium Sa becomes easier. More specifically, the color sample medium Sa is a medium independent from the image forming apparatus 1, wherefore storage of the color sample medium Sa in an anti-fouling condition is easier. In addition, even at the time of fouling of the color sample medium Sa, the reading unit 50 is allowed to constantly read an image of a proper color region only by replacement of the color sample medium Sa with a new one. Moreover, the work required for allowing the reading unit 50 to read the image of the proper color region in this manner is only conveyance of the color sample medium Sa by the conveyance unit 40. Accordingly, the reading unit 50 is more easily correctable by using the color sample medium Sa which is more easily maintained.

Moreover, the image forming apparatus 1 further includes the image forming unit 30 for forming an image on a medium conveyed by the conveyance unit 40, and the reading unit 50 disposed on the downstream side of the image forming unit 30 in the conveyance direction of the medium conveyed by the conveyance unit 40 and reading an image formed on the medium. In this case, the reading unit 50 is allowed to read the recording medium containing the image formed by the image forming unit 30, and check the image. Accordingly, a state of image formation difficult to be checked only by a visual check of the recording medium is recognizable in more detail, wherefore maintenance of the image forming apparatus 1 is more securely realizable.

Furthermore, the conveyance unit 40 is capable of conveying both the recording medium for image formation, and the color sample medium Sa. In this case, the necessity of providing the conveyance unit 40 dedicated only for either one of these media is eliminated. Accordingly, the conveyance unit 40 is usable more efficiently, and the image forming apparatus 1 becomes more compact.

In addition, the color sample medium Sa has a thickness sufficient for preventing such a condition that the other surface of the color sample medium. Sa is seen through the one surface thereof on the side read by the reading unit 50. In this case, deviation of a color detected by the reading unit 50 from an intended color due to transparency does not occur, wherefore the accuracy of correction of data based on the color region of the color sample medium Sa further improves.

Various modified examples according to the present invention are hereinafter described.

Figure 4:
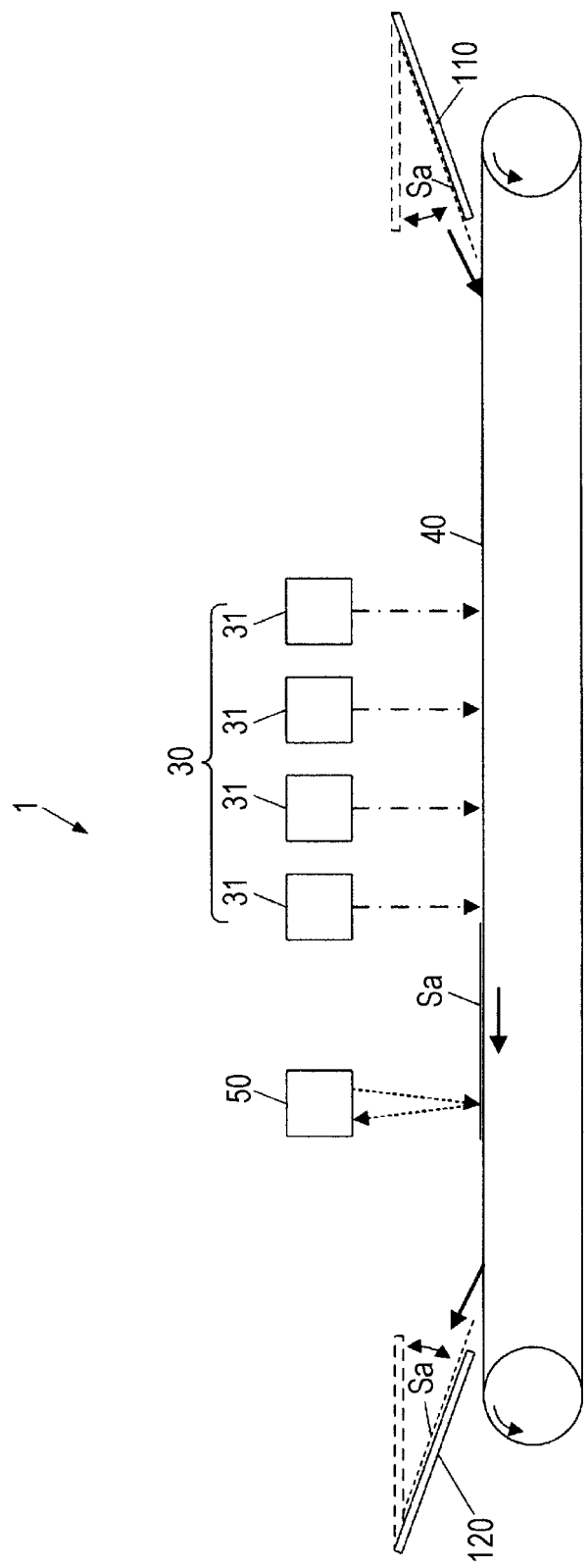
FIG. 4 is a view illustrating an example of the image forming apparatus which further includes a standby unit and an evacuation unit.

For example, as illustrated in FIG. 4, the image forming apparatus 1 according to the embodiment described above may further include a standby unit 110 which puts the color sample medium Sa on standby before conveyance of the color sample medium Sa by the conveyance unit 40. In this case, the conveyance unit 40 conveys the color sample medium Sa from the standby unit 110.

The image forming apparatus 1 may further include an evacuation unit 120 which evacuates the color sample medium Sa conveyed by the conveyance unit 40 as illustrated in FIG. 4, for example. In this case, the conveyance unit 40 conveys the color sample medium Sa read by the reading unit 50, and evacuates the color sample medium Sa toward the evacuation unit 120.

According to this structure, each of the standby unit 110 and the evacuation unit 120 is provided as a component rotatable in the up-down direction with respect to a carrying surface of the conveyance unit 40 on which the medium is carried, and having a sloped surface portion with respect to the carrying surface when lowered as illustrated in FIG. 4, for example.

The standby unit 110 further includes a not-shown roller for guiding the color sample medium Sa carried on the surface portion toward the carrying surface of the conveyance unit 40, a rotating unit which lowers the standby unit 110 in response to a start of the correction process, and raises the standby unit 110 in response to an end of the correction process, and others.

Similarly, the evacuation unit 120 further includes a not-shown roller for guiding the color sample medium Sa carried on the carrying surface of the conveyance unit 40 toward the surface portion, a rotating unit which lowers the evacuation unit 120 in response to a start of the correction process, and raises the evacuation unit 120 in response to an end of the correction process, and others.

The conveyance unit 40 further includes a not-shown driving unit for driving the rollers provided on the standby unit 110 and the evacuation unit 120.

Before a start of the correction process, the color sample medium Sa is in a standby state while carried on the standby unit 110.

When the correction process starts, the standby unit 110 initially lowers. Then, the roller of the standby unit 110 operates to convey the color sample medium Sa from the surface portion of the standby unit 110 toward the conveyance unit 40. Thereafter, the conveyance unit 40 conveys the color sample medium Sa in the same manner as described in the foregoing embodiment. The reading unit 50 reads the color sample medium Sa. The correction unit 70 corrects data. After the correction process, the evacuation unit 120 lowers. Subsequently, the conveyance unit 40 operates the roller of the evacuation unit 120 to evacuate the color sample medium Sa toward the surface portion of the evacuation unit 120.

While the example illustrated in FIG. 4 shows a structure including both the standby unit 110 and the evacuation unit 120, such a structure which includes only either one of these units is adoptable. In this case, operation associated with the omitted configuration is eliminated.

When the standby unit 110 is equipped, the necessity of manually placing the color sample medium Sa on the conveyance unit 40 is eliminated at the time of conveyance of the color sample medium Sa by the conveyance unit 40. Accordingly, laborious and time-consuming work decreases, and the reading unit 50 is more easily correctable.

When the evacuation unit 120 is equipped, the necessity of manually evacuating the color sample medium Sa in real time is eliminated at the time of evacuation of the color sample medium Sa from the conveyance unit 40 after data correction. Accordingly, laborious and time-consuming work decreases, and the reading unit 50 is more easily correctable.

When the color sample medium contains images of color regions of a plurality of colors, the correction unit 70 may correct data associated with the plurality of colors in accordance with reading results of the images of the color regions of the plurality of colors.

For example, the images of the color regions of the plurality of colors may be formed on both surfaces of the color sample medium. In this case, the conveyance unit 40 is capable of using the images of the color regions of the plurality of colors formed on both the surfaces at a time for the correction process executed once when the conveyance unit 40 includes a both-surface conveyance mechanism 45 which conveys a medium such that the reading unit 50 can read both surfaces of the medium.

Figure 5:
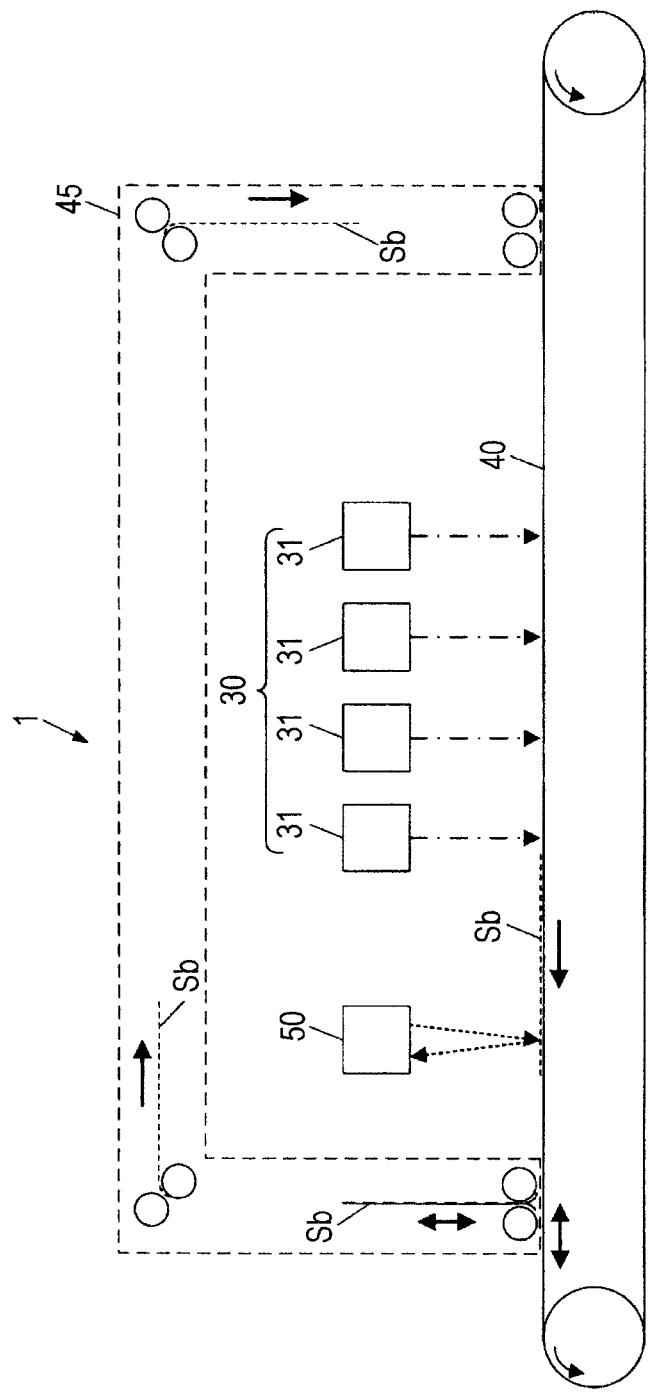
FIG. 5 is a view illustrating an example of the image forming apparatus which further includes a both-surface conveyance mechanism.

More specifically, the image forming apparatus 1 in the embodiment described above further includes the both-surface conveyance mechanism 45 which reverses the surface of the medium carried on the conveyance unit 40 as illustrated in FIG. 5, for example. For example, the both-surface conveyance mechanism 45 receives a medium at a predetermined position on the downstream side of the reading unit 50 in the conveyance direction of the medium conveyed by the conveyance unit 40, conveys the medium toward the upstream side of the image forming unit 30, and again places the medium on the conveyance unit 40 after reversing the medium. The both-surface conveyance mechanism 45 includes a plurality of rollers provided on a both-surface conveyance path formed for this conveyance and reverse of the medium, for example. The reversed medium is again conveyed by the conveyance unit 40 to pass below the image forming unit 30 and the reading unit 50.

In the correction process or others, conveyance of a color sample medium Sb by the conveyance unit 40, reading of the color sample medium Sb by the reading unit 50, and data correction by the correction unit 70 are performed in such a state that the color sample medium Sb is carried on the conveyance unit 40 with one surface of the color sample medium Sb facing the reading unit 50. Subsequently, the both-surface conveyance mechanism 45 conveys the color sample medium Sb from the downstream side toward the upstream side of the reading unit 50 while reversing the color sample medium Sb. As a result, the color sample medium Sb is placed on the conveyance unit 40 with the other surface facing the reading unit 50. Thereafter, conveyance of the color sample medium Sb by the conveyance unit 40, reading of the color sample medium Sb by the reading unit 50, and data correction by the correction unit 70 are performed. Accordingly, the images of the color regions of the plurality of colors formed on both the surfaces are usable at a time for the correction process executed once.

Figure 6A:
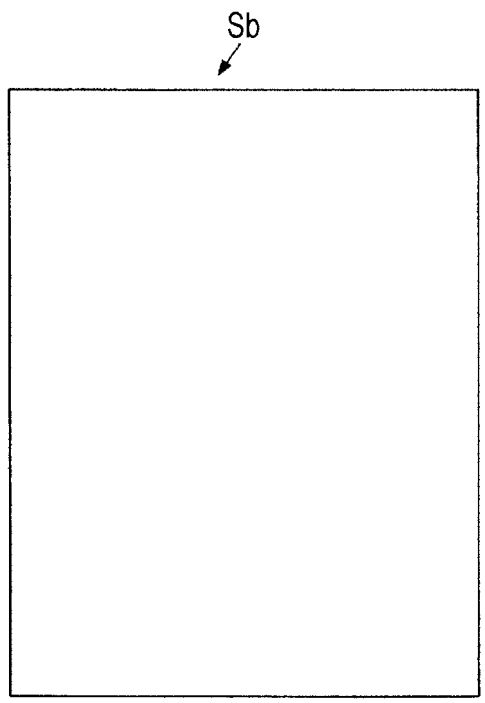
FIG. 6A is a view illustrating an example of one surface (front surface) of a color sample medium.
Figure 6B:
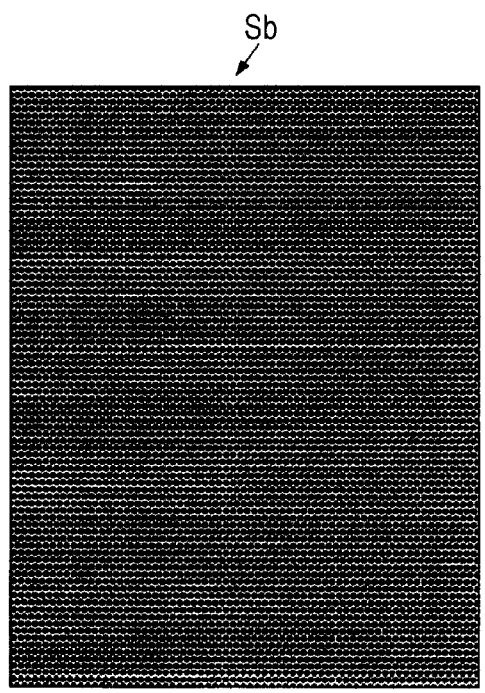
FIG. 6B is a view illustrating an example of the other surface (rear surface) of the color sample medium.

FIGS. 6A and 6B are views illustrating an example of the color sample medium Sb containing an image of a color region of a different color on each of the surfaces of the color sample medium Sb. FIG. 6A is a view illustrating an example of one surface (front surface) of the color sample medium Sb. FIG. 6B is a view illustrating an example of the other surface (rear surface) of the color sample medium Sb.

For example, an image of a color region corresponding to white in the RGB color space is formed on the front surface of the color sample medium Sb illustrated in FIG. 6A, similarly to the color region of the color sample medium Sa according to the embodiment described above, for example.

On the other hand, an image of a color region so determined that all the image pickup devices constituting the linear image sensor of the reading unit 50 indicate such detection results as a color value of 0% (such as 0) and brightness of 0% (such as 0) for all of R, G, and B is formed on the rear surface of the color sample medium Sb illustrated in FIG. 6B, for example. This color region is a color region corresponding to black in the RGB color space.

In a step which disposes the color sample medium Sb such that the front surface thereof faces the reading unit 50 in the correction process, the correction unit 70 performs processing such that all the image pickup devices constituting the linear image sensor of the reading unit 50 indicate such detection results as the color value of 100% (such as 255) and brightness of 100% (such as 255) for all of R, G, and B, in a manner similar to the correction process in the embodiment described above.

On the other hand, in a step which disposes the color sample medium Sb such that the rear surface thereof faces the reading unit 50 in the correction process, the correction unit 70 initially performs processing such that all the image pickup devices constituting the linear image sensor of the reading unit 50 indicate such detection results as the color value of 0% (such as 0) and the brightness of 0% of (such as 0) for all of R, G, and B in a manner similar to the embodiment described above. In this case, there is a possibility that all the image pickup devices constituting the linear image sensor of the reading unit 50 do not indicate the detection results as the color value of 0% (such as 0) and the brightness of 0% (such as 0) for all of R, G, and B under the intensity of the light of the light source and the sensitivities of the respective image pickup devices for maintaining such a state that all the image pickup devices constituting the linear image sensor of the reading unit 50 indicate the detection results as the color value of 100% (such as 255) and the brightness of 100% (such as 255) for all of R, G, and B concerning white. In this case, the correction unit 70 may obtain color values or values of brightness for R, G, and B detected by the respective image pickup devices when reading black under the state that all the image pickup devices constituting the linear image sensor of the reading unit 50 indicate the detection results as the color value of 100% (such as 255) and the brightness of 100% (such as 255) for all of R, G, and B concerning white, while maintaining this state. Then, the correction unit 70 may rewrite the detection results of the respective image pickup devices concerning black in standard data based on the obtained values, for example. When such an image pickup device which does not indicate a detection result as the color value of 0% for all of R, G, and B concerning black, such as brightness for R, G, and B as (R, G, B=0, 0, 1), is present in the settings of condition data for producing such detection results as the color value of 100% (such as 255) and the brightness of 100% (such as 255) for all of R, G, and B concerning white, for example, the corresponding detection result concerning black may be overwritten on the data concerning black of the corresponding image pickup device in the standard data. In this case, processing is performed on the assumption that black has been read by the corresponding image pickup device when the detection result (R, G, B=0, 0, 1) is obtained. Concerning white, such detection results as the color value of 100% (such as 255) and the brightness of 100% (such as 255) for all of R, G, and B are obtainable. In this case, processing is performed on the assumption that white has been read. In other words, proper reading of both white and black is executable.

As discussed above, rewriting of the standard data, rather than the condition data, may be executed such that the standard data reflects individual differences between the respective image pickup devices. In this case, data correction for proper recognition of a plurality of colors, such as white and black, is achievable.

The specific configuration of the both-surface conveyance mechanism 45 illustrated in FIG. 5, and the colors of the color regions of both surfaces of the color sample medium Sb illustrated in FIGS. 6A and 6B are presented only by way of example. The corresponding configuration and colors are not limited to these examples, but may be modified in appropriate manners.

Data correction associated with a plurality of colors finishes at a time when the correction unit 70 corrects data associated with the plurality of colors based on reading results obtained by reading images of color regions of the plurality of colors formed on the color sample medium. Accordingly, labor and time required for data correction for maintaining recognition accuracy concerning a plurality of colors decreases, wherefore the reading unit 50 is more easily correctable.

Both the surfaces of the color sample medium Sb are usable for data correction when the both-surface conveyance mechanism 45 conveys the color sample medium Sb while allowing the reading unit 50 to read images of color regions of a plurality of colors formed on both the surfaces of the color sample medium Sb. In this case, a larger area is allocatable to a color region in comparison with a structure using only one of surfaces of a color sample medium having the same area. Accordingly, a space available for forming images of a plurality of color regions on the color sample medium increases, in which condition data correction for maintaining recognition accuracy concerning a plurality of colors is more easily achievable.

The image forming apparatus 1 according to this embodiment may further include a determination unit 130 for determining reading timing for respective images of color regions of a plurality of colors formed on a color sample medium Sc conveyed by the conveyance unit 40. In this case, the reading unit 50 reads the respective images of the color regions of the plurality of colors in accordance with the reading timing determined by the determination unit 130.

FIG. 7 is a view illustrating an example of the color sample medium Sc containing images of color regions of a plurality of colors on one of the surfaces of the color sample medium Sc.

As illustrated in FIG. 7, one of the surfaces of the color sample medium Sc has a plurality of sectioned color regions each of which has a predetermined width, for example. In this case, the one surface of the color sample medium Sc is sectioned into a plurality of parts in the direction of conveyance by the conveyance unit 40. In this case, the reading unit 50 is allowed to sequentially read the images of the color regions of different colors only by conveyance of the color sample medium Sc using the conveyance unit 40.

A color region C1 positioned on the most downstream side in the image in the direction of conveyance by the conveyance unit 40 in the plurality of color regions formed on the color sample medium Sc illustrated in FIG. 7 functions as a color region corresponding to white in the RGB color space and similar to the color region of the color sample medium Sa in the embodiment described above. A color region C2 positioned in the intermediate part of the color sample medium Sc in the direction of conveyance by the conveyance unit 40 functions as a color region corresponding to black in the RGB color space and similar to the color region of the rear surface of the color sample medium Sb described above, for example. A color region C3 positioned on the most upstream side in the direction of conveyance of the conveyance unit 40 is a color region provided such that all the image pickup devices constituting the linear image sensor of the reading unit 50 indicate such detection results as a color value of 50% (such as 127) and brightness of 50% (such as 127) for all of R, G, and B, for example. The color region C3 is a color region corresponding to gray as an intermediate color between white and black in the RGB color space.

In a step which allows the reading unit 50 to read the image in the color region C1 of the color sample medium Sc in the correction process, the correction unit 70 performs processing such that all the image pickup devices constituting the linear image sensor of the reading unit 50 indicate such detection results as the color value of 100% (such as 255) and the brightness of 100% (such as 255) for all of R, G, and B. In a step which allows the reading unit 50 to read the image in the color region C2 of the color sample medium Sc, the correction unit 70 performs processing such that both white and black are properly recognizable in a manner similar to above. In a step which allows the reading unit 50 to read the image in the color region C3 of the color sample medium Sc, the correction unit 70 performs processing such that all of white, black, and gray are properly recognizable by using a mechanism similar to data correction concerning black for proper recognition of white and black, for example.

According to the present description, condition data is rewritten for white, while standard data is rewritten for other colors. However, the method for rewriting is not limited to the method presented only by way of example. For example, condition data may be rewritten for any one color other than white, while standard data may be rewritten for the remaining colors corresponding to correction targets.

Figure 9:
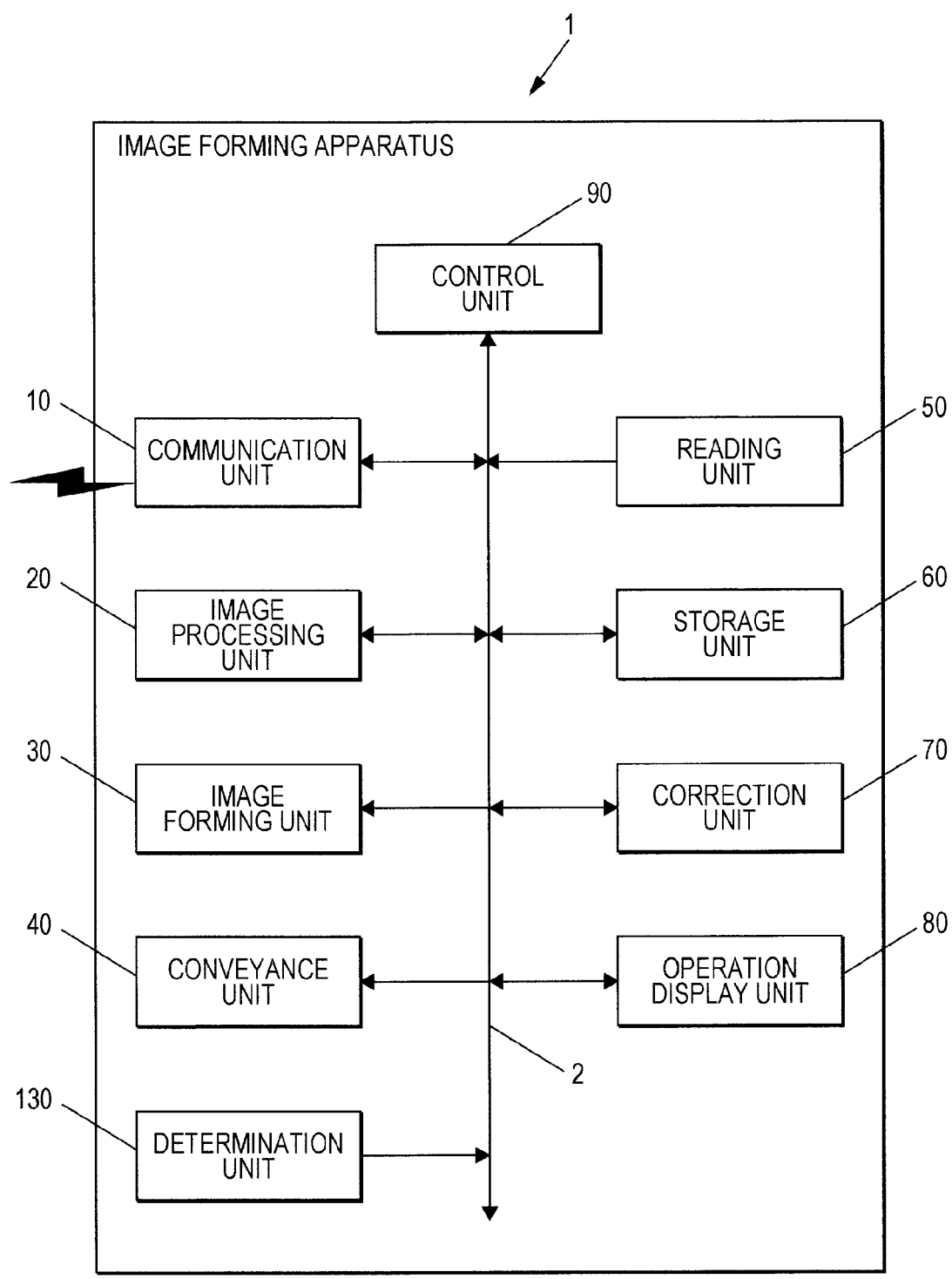
FIG. 9 is a block diagram of the image forming apparatus illustrated in FIG. 8.

FIGS. 8 and 9 illustrate an example of the image forming apparatus 1 further including the determination unit 130.

The image forming apparatus 1 according to the embodiment described above further includes the determination unit 130 disposed on the upstream side of the reading unit 50 in the conveyance path for the medium conveyed by the conveyance unit 40 as illustrated in FIG. 8, for example. The determination unit 130 includes, in a conveyance path for a medium conveyed by the conveyance unit 40, a detection unit which detects passage of the medium conveyed by the conveyance unit 40 at a predetermined position on the upstream side of the reading unit 50 for output of predetermined signals, an output unit which outputs, to the reading unit 50, information indicating reading timing of respective images of color regions of a plurality of colors based on the predetermined signals output from the detection unit, an related information storage unit which stores related information concerning determination of the reading timing, and other components, for example.

The related information storage unit stores data associated with specification of timing at which the medium having passed through the predetermined position passes below the reading unit 50. More specifically, the related information storage unit stores a conveyance speed of the medium conveyed by the conveyance unit 40, i.e., data for specifying a conveyance amount per unit time.

The output unit refers to the information stored in the related information storage unit in response to output of the predetermined signals from the detection unit, specifies timing at which reading start positions of the respective images of the color regions on the color sample medium Sc reach an area below the reading unit 50 based on calculations or other methods, and determines this timing as reading timing. Accordingly, the determination unit 130 determines the reading timing in accordance with the conveyance amount of the color sample medium Sc from the predetermined position on the upstream side of the reading unit 50 in the conveyance direction of the medium conveyed by the conveyance unit 40.

The determination unit 130 outputs the reading timing. The reading unit 50 reads the images of the respective color regions in accordance with the reading timing. The correction unit 70 corrects data corresponding to respective colors of the color regions.

This structure further includes the determination unit 130 for determining reading timing of the respective images of the color regions of the plurality of colors formed on the color sample medium Sc conveyed by the conveyance unit 40. The reading unit 50 reads the respective images of the color regions of the plurality of colors in accordance with the reading timing determined by the determination unit 130. In this case, the reading unit 50 is capable of properly and automatically reading the images of the respective color regions of the color sample medium Sc containing the images of the plurality of color regions. Accordingly, labor and time required for data correction for maintaining recognition accuracy for a plurality of colors decreases, wherefore the reading unit 50 is more easily correctable.

Moreover, the determination unit 130 determines the reading timing in accordance with the conveyance amount of the color sample medium Sc conveyed by the conveyance unit 40. In this case, the reading unit 50 is allowed to properly and automatically read the images of the respective color regions of the color sample medium Sc containing the images of the plurality of color regions only by formation of images of a plurality of color regions in the conveyance direction of the medium conveyed by the conveyance unit 40. Accordingly, labor and time required for data correction for maintaining recognition accuracy for a plurality of colors decreases, wherefore the reading unit 50 is more easily correctable.

The images of the plurality of color regions associated with determination of the reading timing by the determination unit 130 are not limited to images of a plurality of color regions formed on one of the surfaces of the color sample medium Sc. For example, the determination unit 130 is capable of determining the reading timing for the color sample medium Sb containing images of color regions on both the surfaces of the color sample medium Sb when the detection unit of the determination unit 130 added together with the both-surface conveyance mechanism 45 detects both the timing for conveyance of the color sample medium Sb conveyed with one of the surfaces thereof facing the reading unit 50, and the timing for conveyance of the color sample medium Sb conveyed with the other surface thereof facing the reading unit 50.

Moreover, the method for determining the reading timing by the determination unit 130 is not limited to the method described above presented only by way of example. For example, the determination unit 130 may determine the reading timing for the respective color regions by detecting indexes indicating boundaries between the plurality of color regions formed on the color sample medium.

Furthermore, the data stored in the storage unit 60 and corrected by the correction unit 70 is not limited to the standard data or condition data described above.

Figure 10:
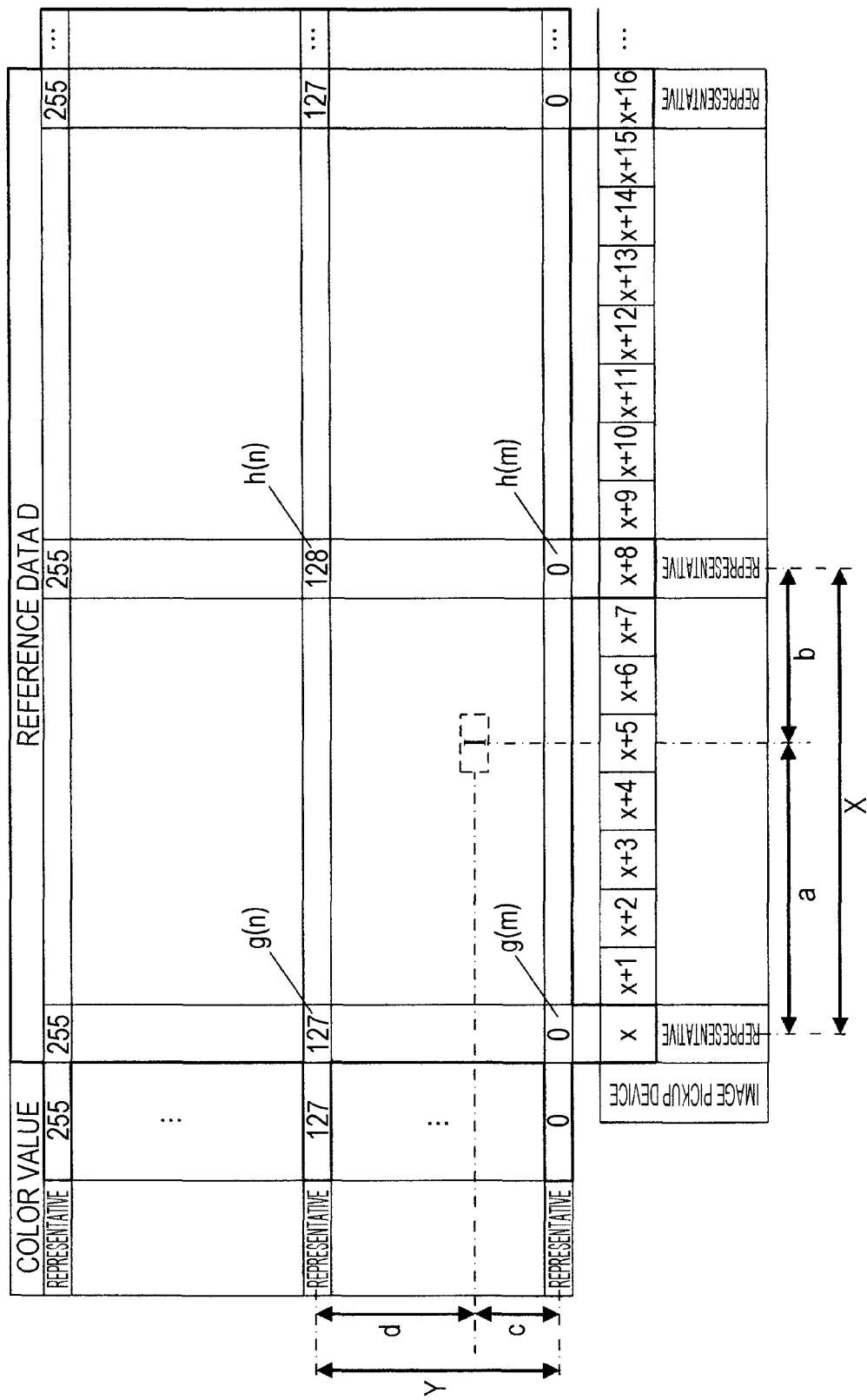
FIG. 10 is a view illustrating an example of reference data corresponding to shading correction of a predetermined color.

For example, this data may be may be reference data D associated with shading correction for a predetermined color as illustrated in FIG. 10.

The reference data D contains a plurality of reference values set individually, as values corresponding to a plurality of representative color values of numbers smaller than a predetermined number of gradations, selected within a range of the predetermined number of gradations from the minimum color value to the maximum color value for a predetermined color for each of a plurality of representative image pickup devices of a number smaller than a predetermined number selected from the predetermined number of image pickup devices. The predetermined number of image pickup devices in this context refer to the predetermined number of image pickup devices constituting the linear image sensor of the reading unit 50, for example.

More specifically, the reference data D contains reference values corresponding to a plurality of representative color values of a number smaller than a predetermined number of gradations, as representative color values selected within a range of the predetermined number of gradations (such as 256) from the minimum value (such as 0) to the maximum value (such as 255) for a predetermined color as illustrated in FIG. 10, for example. According to the reference data D illustrated in FIG. 10 as an example, values are cyclically selected as representative color values at intervals of a predetermined color value thinning number (such as 128) within the range from 0 to 255, such as "0", "127", and "255". Based on this selection, reference values are set for the corresponding representative color values, with reference values corresponding to values other than the representative color values thinned out. The selection of the representative color values associated with the reference values to be set is not limited to this selection presented only by way of example, but may be modified in appropriate manners. For example, a part or all of the cycles of the values corresponding to the representative values may be determined in a non-cyclic manner.

The reference values are set for the plurality of representative image pickup devices of a number smaller than the predetermined number, as representative image pickup devices selected cyclically at intervals of a predetermined image pickup device thinning number (such as 8), as "x", "x+8", and "x+16" from the left side of the predetermined number of image pickup devices provided in a predetermined direction, for example. According to the example illustrated in FIG. 10, the image pickup devices after "x+16" are not shown. However, the reference data D further includes reference values set for other representative image pickup devices selected cyclically at the intervals of the predetermined image pickup device thinning number (such as 8), similarly to the image pickup devices "x", "x+8", and "x+16". In addition, the cycle associated with selection of the representative image pickup devices in the reference data D is not limited to the cycle illustrated in FIG. 10 presented only by way of example. This cycle may be modified in appropriate manners similarly to the cycle of the values corresponding to the foregoing representative color values. However, from the viewpoint of facilitation of interpolation of the thinned parts in the vicinity of both ends of the color values and the image pickup devices, it is preferable that the representative color values and the representative image pickup devices are so determined as to include both ends of the color values and the image pickup devices.

According to this embodiment, the representative color values are so determined as to include the minimum color value and the maximum color value, while the representative image pickup devices are so determined as to include X and X+(predetermined number−1).

For example, the reference values are values used for correction for respective values corresponding to representative color values and read by the respective image pickup devices determined as representative image pickup devices when colors of the respective values are read as illustrated in FIG. 10.

For example, in case of the example illustrated in FIG. 10, a reference number "127" is set for the image pickup device "x" concerning a representative color value "127". This setting indicates that the value "127" is used as a reading result as it is when the value "127" is obtained as a reading result of the image pickup device "x". On the other hand, a reference number "128" is set for the image pickup device "x+8" concerning the representative color value "127". In this case, it is intended to correct the reading result "128" into "127" when the value "128" is obtained as the reading result of the image pickup device "x+8", instead of "127" as a value which should be obtained as the reading result, for various reasons of producing the reading result indicating the value "128", such as individual differences between the image pickup devices.

Figure 11:
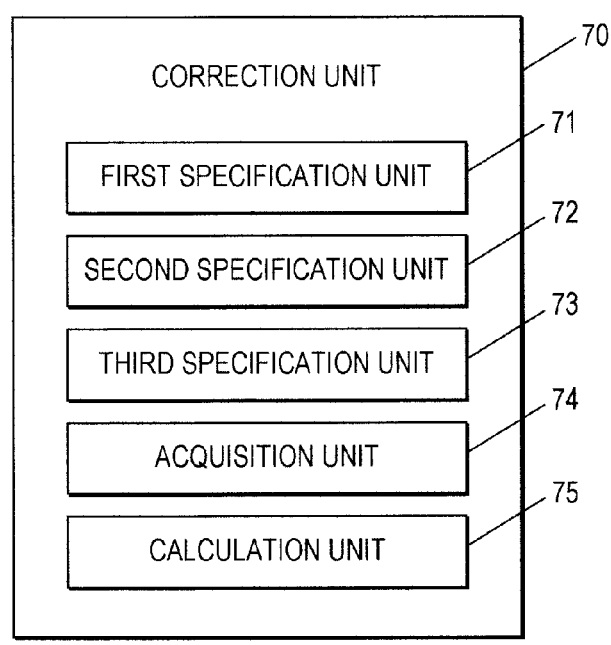
FIG. 11 is a block diagram illustrating a chief configuration of a correction unit at the time of correction using reference data.

FIG. 11 is a block diagram illustrating a chief configuration of the correction unit 70 employed at the time of correction by using the reference data D.

The correction unit 70 includes a first specification unit 71, a second specification unit 72, a third specification unit 73, an acquisition unit 74, and a calculation unit 75.

The first specification unit 71 functions as a first specification means for specifying an image pickup device corresponding to a correction target in a predetermined number of image pickup devices constituting the linear image sensor.

More specifically, the first specification unit 71 specifies an image pickup device not yet corrected at the time of output of a reading result among all the image pickup devices, in the condition that the respective image pickup devices are individually corrected by the correction unit 70 during operation of the linear image sensor where all the image pickup devices operate.

The second specification unit 72 functions as a second specification means for specifying a representative image pickup device corresponding to the image pickup device specified by the first specification unit 71. In this case, the second specification unit 72 may retain information indicating image pickup devices corresponding to representative image pickup devices, or obtains this information by referring to the reference data D.

More specifically, the second specification unit 72 specifies a first image pickup device contained in the respective representative image pickup devices and corresponding to the representative image pickup device closest to the image pickup device specified by the first specification unit 71 on one side (such as left side in FIG. 10) in a predetermined direction along the predetermined number of image pickup devices. Moreover, the second specification unit 72 specifies a second image pickup device contained in the respective representative image pickup devices and corresponding to the representative image pickup device closest to the image pickup device specified by the first specification unit 71 on the other side (such as right side in FIG. 10) in the predetermined direction along the predetermined number of image pickup devices.

For example, when the image pickup device specified by the first specification unit 71 is an image pickup device "x+5" as illustrated in FIG. 10, the second specification unit 72 specifies the image pickup device "x" as the first image pickup device in the image pickup devices "x", "x+8", "x+16" and others, and specifies the image pickup device "x+8" as the second image pickup device.

When the image pickup device specified by the first specification unit 71 corresponds to any one of the image pickup devices corresponding to the representative image pickup devices, the second specification unit 72 determines this image pickup device as the first image pickup device, and omits specification of the second image pickup device.

As described above, the second specification unit 72 specifies one representative image pickup device corresponding to the image pickup device specified by the first specification unit 71 when the image pickup device specified by the first specification unit 71 corresponds to any one of the plurality of representative image pickup devices. On the other hand, the second specification unit 72 specifies two representative image pickup devices close to the image pickup device specified by the first specification means when the image pickup device specified by the first specification means does not correspond to any of the plurality of representative image pickup devices.

The third specification unit 73 functions as a third specification means for specifying a representative color value corresponding to a color value indicated by a reading result obtained from the image pickup device specified by the first specification unit 71.

More specifically, the third specification unit 73 specifies, as a first color value, a representative value exhibiting the highest similarity to the color value indicated by the reading result obtained from the image pickup device specified by the first specification unit 71 in representative color values corresponding to color values equal to or smaller than the color value indicated by the corresponding reading result, for example. Moreover, the third specification unit 73 specifies, as a second color value, a representative value exhibiting the highest similarity to the color value indicated by the reading result from the image pickup device specified by the first specification unit 71 in representative color values corresponding to color values equal to or larger than the color value indicated by the corresponding reading result. In this case, the third specification unit 73 may retain information indicating color values corresponding to the representative color values within a range of a predetermined number of gradations from the minimum color value to the maximum color value, or obtain this information by referring to the reference data D.

For example, when the color value indicated by the reading result of the image pickup device specified by the first specification unit 71 (hereinafter referred to as before correction value I) is "3", the third specification unit 73 specifies, as the first color value, the representative color value "0" in the respective representative color values "0", "127", and "255" shown in FIG. 3, and specifies the representative color value "127" as the second color value.

When the color value indicated by the reading result from the image pickup device specified by the first specification unit 71 corresponds to anyone of the color values corresponding to the representative color values, the third specification unit 73 determines the corresponding color value as the first color value, and omits specification of the second color value.

Accordingly, when the color value indicated by the reading result obtained from the image pickup device specified by the first specification unit 71 corresponds to any one of the plurality of representative color values, the third specification unit 73 specifies one representative color value corresponding to this color value. When the color value indicated by the reading result obtained from the image pickup device specified by the first specification unit 71 does not correspond to any of the plurality of representative color values, the third specification unit 73 specifies two representative values similar to the corresponding color value indicated by the reading result.

The acquisition unit 74 functions as an acquisition means for acquiring, from the storage unit 60, reference values corresponding to a combination of the representative image pickup device specified by the second specification unit 72, and the representative color value specified by the third specification unit 73.

For example, when specification of the first image pickup device and the second image pickup device by the second specification unit 72, and specification of the first color value and the second color value by the third specification unit 73 are made, the acquisition unit 74 reads four reference values from the storage unit 60 and acquires these values. In this case, the four reference values are reference values set for the first image pickup device and the second image pickup device specified by the second specification unit 72, and correspond to the first color value and the second color value specified by the acquisition unit 74, in the plurality of reference values contained in the reference data D. On the other hand, when only the first image pickup device is specified by the second specification unit 72, the acquisition unit 74 reads the reference value set for the first image pickup device from the storage unit 60, and acquires this value. In addition, when only the first color value is specified by the third specification unit 73, the acquisition unit 74 reads the reference value corresponding to the first color value from the storage unit 60, and acquires this value.

The calculation unit 75 functions as a calculation means for calculating a correction value corresponding to a value indicated by the reading result obtained from the image pickup device specified by the first specification unit 71 in an interpolation process based on the reference values obtained by the acquisition unit 74.

More specifically, the calculation unit 75 corrects a value indicated by the before correction value I, using two-dimensional linear interpolation as expressed in Equation (1) shown below, based on the four reference values acquired by the acquisition unit 74, and performs calculation using the corrected value as an output value O. In this equation, X indicates a cycle of representative image pickup devices corresponding to a predetermined image pickup device thinning number (such as X=8). In this equation, Y indicates a cycle of representative color values corresponding to a predetermined color value thinning number (such as Y=128). In this equation, a indicates an interval between the image pickup device corresponding to the before correction value I and the first image pickup device in the cycle of the representative image pickup devices. In this equation, b indicates an interval between the image pickup device corresponding to the before correction value I and the second image pickup device in the cycle of the representative image pickup devices. In this equation, c indicates a difference between the value indicated by the before correction value I and the first color value in the cycle of the representative color values. In this equation, d indicates a difference between the value indicated by the before correction value I and the second color value in the cycle of the representative color values. In this equation, g indicates the first image pickup device. In this equation, h indicates the second image pickup device. In this equation, m indicates a reference value corresponding to the first color value. In this equation, n indicates a reference value corresponding to the second color value. For example, a value described as g(m) indicates a reference value corresponding to the first color value (m) of the first image pickup device (g).

[Equation 1]

$$O = \frac{g(m)(X-a)(Y-c) + g(n)(X-a)(Y-d) + h(m)(X-b)(Y-c) + h(n)(X-b)(Y-d)}{X \times Y} \quad (1)$$

When the image pickup device "x+5" indicated by the first specification unit 71, and the value "3" indicated by the before correction value I are obtained as illustrated in FIG. 10, for example, the calculation unit 75 acquires four reference values g(m), g(n), h(m), and h(n) for setting the image pickup device "x" as the first image pickup device, the image pickup device "x+8" as the second image pickup device, the representative color value "0" as the first color value, and the representative color value "5" as the second color value. Then, the calculation unit 75 calculates the output value O based on the foregoing Equation (1).

When a fraction is produced as a result of calculation based on Equation (1), the calculation unit 47 processes this fraction by executing a predetermined process of rounding figures. Examples of the process of rounding figures include a method for counting fractions over ½ as one and disregarding the rest, and methods for rounding up and rounding down.

When only the first image pickup device is specified by the second specification unit 72, the calculation unit 75 omits calculation associated with the second image pickup device in Equation (1). More specifically, the calculation unit 75 omits calculations associated with h(m) and h(n) contained in Equation (1).

When only the first color value is specified by the third specification unit 73, the calculation unit 75 omits calculation associated with the second color value in Equation (1). More specifically, the calculation unit 75 omits calculation associated with (n) contained in Equation (1).

The correction unit 70 adds information indicating the image pickup device specified by the first specification unit 71 to the correction value calculated by the calculation unit 75, and outputs the result.

The correction unit 70 corrects the reading results by performing the correction described above for all of the image pickup devices constituting the linear image sensor.

Figure 12:
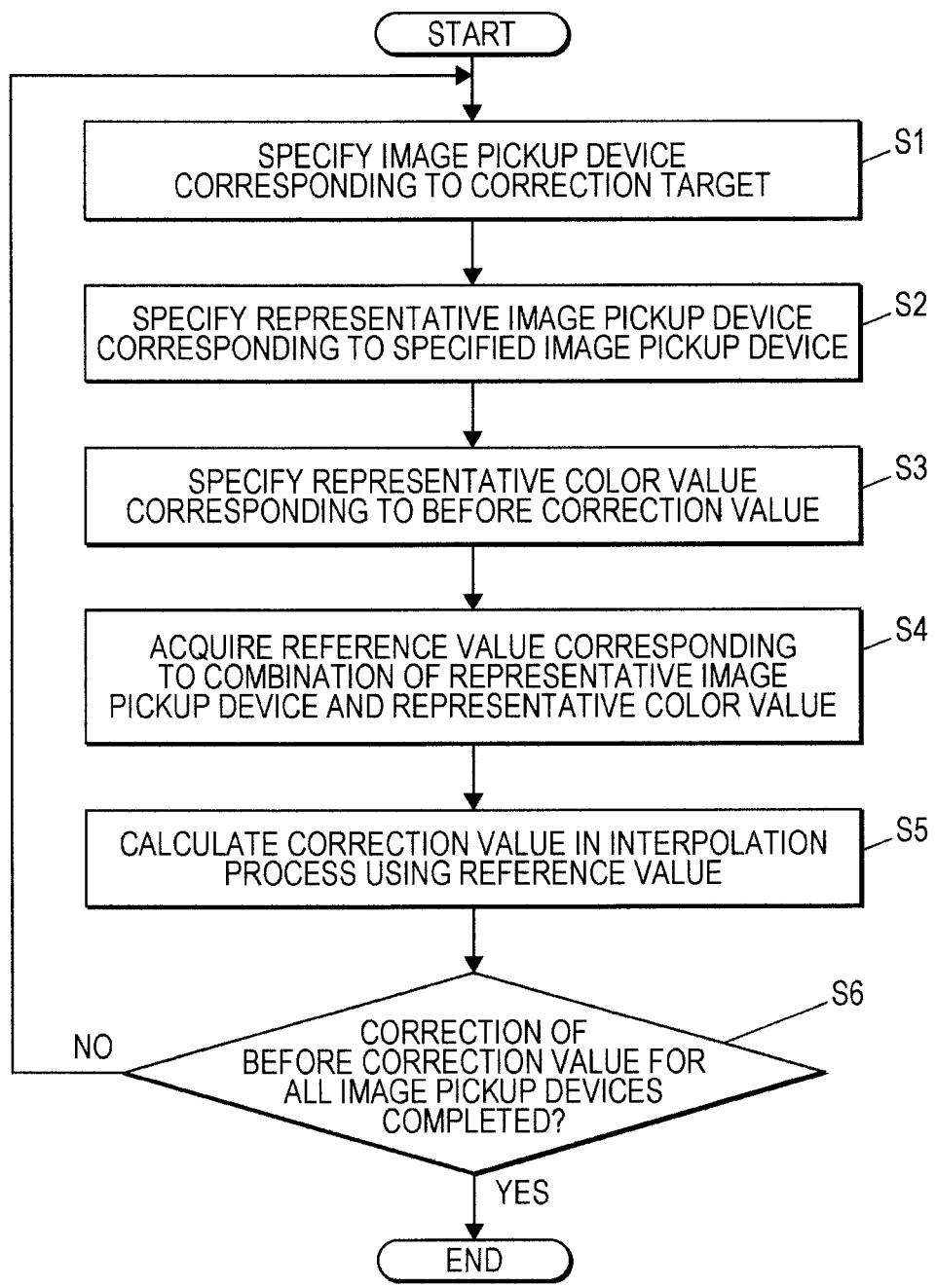
FIG. 12 is a flowchart illustrating an example of a flow of a correction process using the reference data.

A flow of the correction process using the reference data D is hereinafter described with reference to a flowchart illustrated in FIG. 12.

Initially, the first specification unit 71 specifies an image pickup device corresponding to a correction target (step S1).

Then, the second specification unit 72 specifies a representative image pickup device corresponding to the image pickup device specified by the first specification unit 71 (step S2).

Moreover, the third specification unit 73 specifies a representative color value contained in a plurality of reference values set in the reference data D and corresponding to the before correction value I of the image pickup device specified by the first specification unit 71 (step S3).

Then, the acquisition unit 74 acquires reference values corresponding to a combination of the representative color value and the representative image pickup device (step S4).

Subsequently, the calculation unit 75 calculates a correction value corresponding to a value indicated by a reading result obtained from the image pickup device specified by the first specification unit 71 in an interpolation process based on the reference values acquired by the acquisition unit 74 (step S5).

When correction is not completed for the before correction values I associated with all the image pickup devices (step S6: NO), the flow shifts to step S1. When correction is completed for the before correction values I associated with all the image pickup devices (step S6: YES), the correction process ends.

The image reading device may include a function for performing various types of processes for setting the reference data D.

An example of steps performed in association with setting of the reference data D is hereinafter described.

Specifically, a color sample medium containing a gradation pattern is initially prepared. The gradation pattern in this context refers to an image of a color region formed such that a value of a predetermined color sequentially increases or decreases within a range from the minimum value to the maximum value in the conveyance direction of the color sample medium. Examples of preparation of the color sample medium include positioning of the color sample medium on the conveyance unit 40, and setting of the color sample medium with respect to the standby unit 110.

Then, the color sample medium is read by the reading unit 50.

More specifically, the conveyance unit 40 conveys the color sample medium in response to input of a start of reading via the operation display unit 80, allowing the reading unit 50 to read the color sample medium, for example. As a result, correction image data corresponding to original data of the reference data D is generated as illustrated in FIG. 13. In this case, correction is not performed by the correction unit 70 at the time of generation of the correction image data, for example.

Then, the control unit 90 specifies pixels corresponding to a combination of a representative image pickup device and a representative color value in a plurality of pixels constituting the correction image data.

More specifically, the control unit 90 specifies pixels which correspond to the gradation pattern read by the image pickup device corresponding to the representative image pickup device, and correspond to the representative color value as illustrated in FIG. 14, for example.

The control unit 90 further obtains values of the specified pixels.

Then, the control unit 90 generates the reference data D containing the obtained values of the pixels as reference values corresponding to the combination of the representative image pickup device and the representative color value associated with the positions of the pixels. Subsequently, the control unit 90 stores the generated reference data D in the storage unit 60. Thereafter, the correction unit 70 makes correction by using the reference data D stored in the storage unit 60. The reference data D may contain primary colors (R, G, B), or monochrome gradation patterns set individually, for example. Needless to say, the reference data D may be individually set for other colors.

Figure 15:
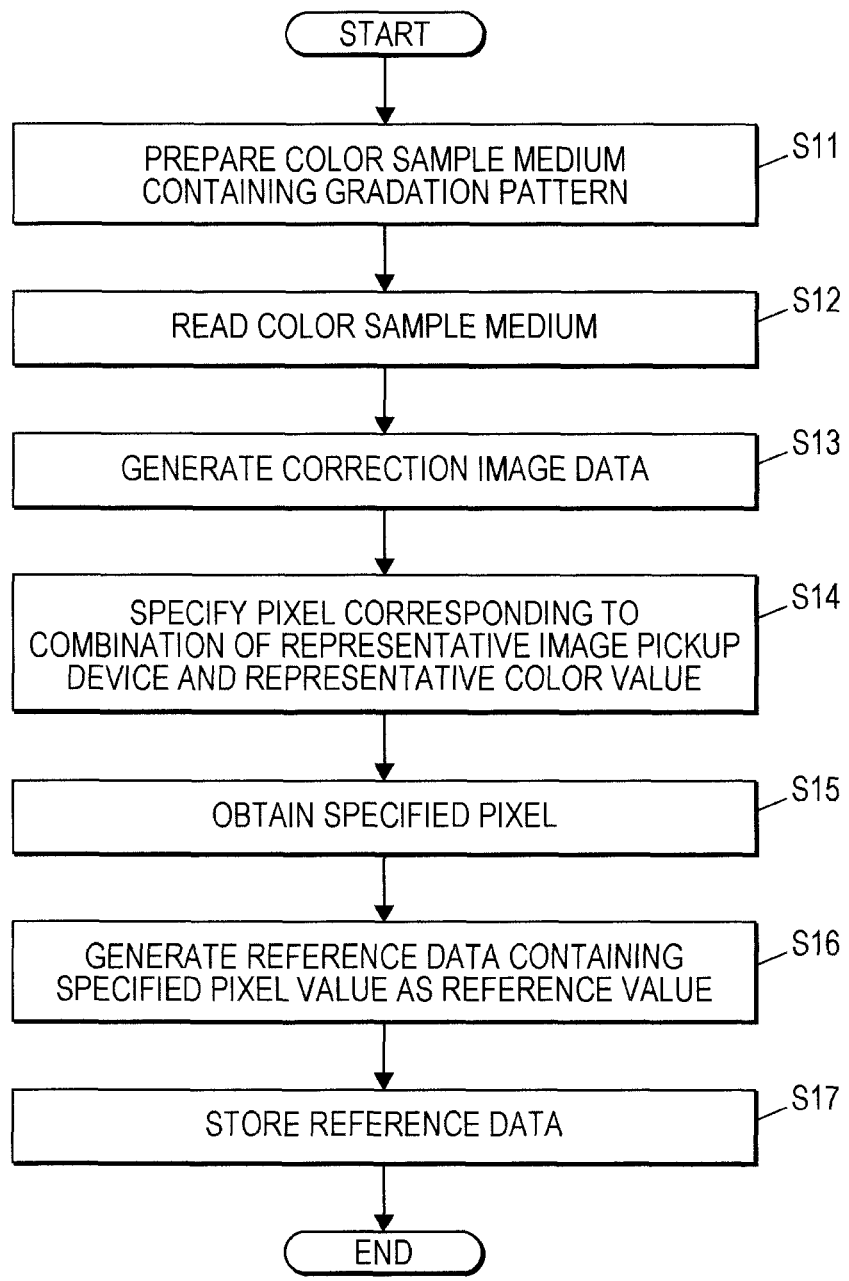
FIG. 15 is a flowchart illustrating an example of a method for setting the reference data.

A method for setting the reference data D is hereinafter described with reference to a flowchart illustrated in FIG. 15.

Initially, a color sample medium containing a gradation pattern is prepared (step S11).

Then, the reading unit 50 reads the color sample medium (step S12), and generates correction image data (step S13).

Subsequently, the control unit 90 specifies pixels corresponding to a combination of a representative image pickup device and a representative color value in a plurality of pixels constituting the correction image data (step S14). The control unit 90 further obtains values of the specified pixels (step S15).

Then, the control unit 90 generates the reference data D containing the obtained values of the pixels as reference values corresponding to the combination of the representative image pickup device and the representative color value associated with the positions of the pixels (step S16). Thereafter, the control unit 90 stores the generated reference data D in the storage unit 60 (step S17).

According to the foregoing calculation method, the representative color value is specified after the representative image pickup device is specified. However, the representative color value may be specified before specification of the representative image pickup device, or both specifications may be executed in parallel.

The method for setting the reference data D is not limited to the method presented only by way of example. The plurality of reference values set for the reference data D are only required to be set based on values indicated by reading results obtained from a plurality of representative image pickup devices having read a color sample corresponding to a plurality of representative color values of a predetermined color.

For example, while all the image pickup devices constituting the linear image sensor execute reading in the method for setting the reference data D described above, it is only required to read by the image pickup devices corresponding to the representative image pickup devices. Moreover, while the color sample medium which contains the gradation pattern including all values from the minimum value to the maximum value is read in the method for setting the reference data D described above, it is only required to read a color sample medium which contains only images of color regions associated with values corresponding to representative values. According to the latter case, a representative image pickup device and a representative color value are selectable based on results of comparisons between all pixels.

Furthermore, the method for setting the reference data D may again executed after setting of the reference data D. In this case, the reference data D becomes data capable of realizing more accurate correction when setting of the reference data D is repeated until no error is produced between the reference data D set immediately before and the latest reference data D.

Based on the correction using the reference data D, all of the predetermined number of image pickup devices are correctable without the necessity of storing data for correction for all of the predetermined number of image pickup devices included in the reading unit 50 and provided in the predetermined direction. Accordingly, the capacity of data to be stored in the storage unit 60 for correction is allowed to decrease.

Moreover, the reference values contained in the reference data are set based on the values indicated by the reading results obtained from the representative image pickup devices having read the color sample corresponding to the representative color values of the predetermined color in the condition of no correction by the correction unit 70. In this case, correction is made based on the actual reading results by the representative image pickup devices. Accordingly, more accurate correction is achievable.

According to the embodiment described above, the second specification unit 72 omits specification of the second image pickup device when the image pickup device specified by the first specification unit 71 corresponds to any one of the representative image pickup devices. In this case, the calculation unit 75 omits calculation associated with the second image pickup device in Equation (1). However, other methods may be employed. For example, when the image pickup device specified by the first specification unit 71 corresponds to any one of the representative image pickup devices, the second specification unit 72 may specify the image pickup device specified by the first specification unit 71 as the first image pickup device, and specify any one of image pickup devices closest to the first image pickup device as the second image pickup device. In this case, the coefficient in the calculation associated with the second image pickup device in Equation (1) becomes 0, wherefore the reference value associated with the second image pickup device is ignored. Accordingly, a calculation result identical to that of the embodiment described above is obtainable.

According to the embodiment described above, the third specification unit 73 omits specification of the second color value when the color value indicated by the reading result obtained from the image pickup device specified by the first specification unit 71 corresponds to any one of the representative values. In this case, the calculation unit 75 omits calculation associated with the second color value in Equation (1). However, other methods may be employed. For example, when the color value indicated by the reading result obtained from the image pickup device specified by the first specification unit 71 corresponds to any one of the representative color values, the third specification unit 73 may specify the color value indicated by the reading result as the first color value, and specify any one of the representative color values exhibiting the highest similarity to the first color value as the second color value. In this case, the coefficient of the calculation associated with the second color value in Equation (1) becomes 0, wherefore the reference value associated with the second color value is ignored. Accordingly, a calculation result identical to that of the embodiment described above is obtainable.

The shapes and positions of the respective units constituting the image forming apparatus 1, such as the shape of the conveyance unit 40, may be modified in appropriate manners.

Figure 16:
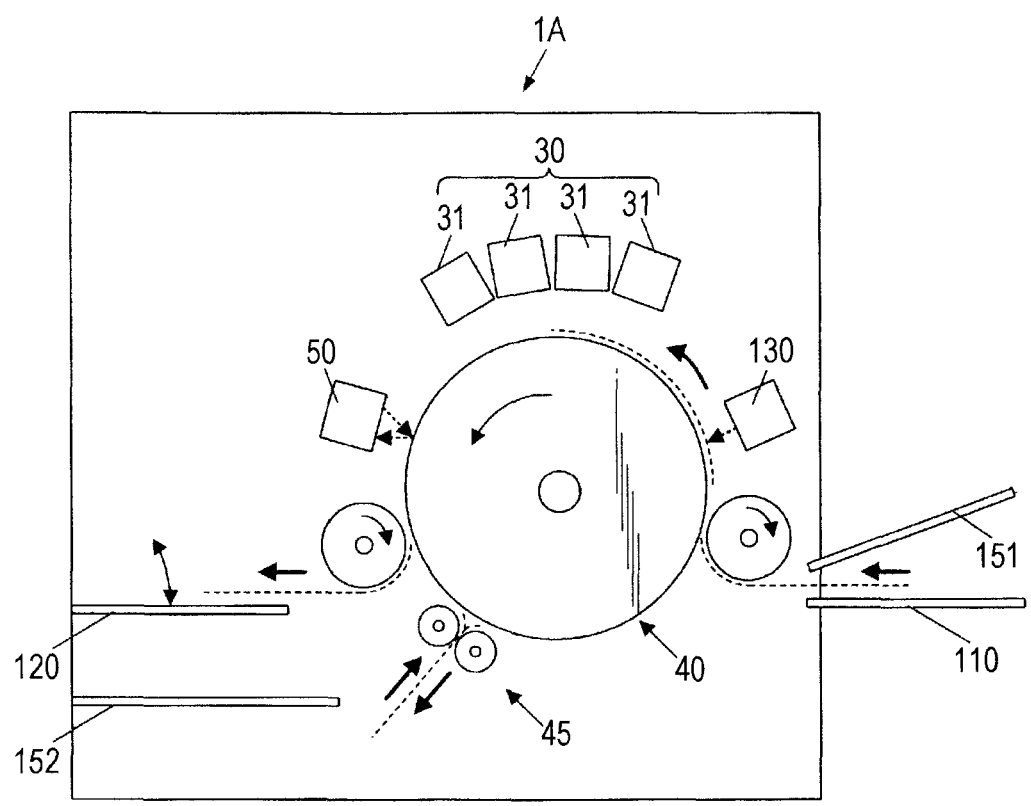
FIG. 16 is a view illustrating an example of an image forming apparatus which includes a drum type conveyance unit.

For example, the present invention is applicable to an image forming apparatus 1A including the drum-type conveyance unit 40 as illustrated in FIG. 16. In this case, each of the head units 31 of the image forming unit 30 is arranged along the circular arc of the outer circumferential surface of the drum of the conveyance unit 40. Moreover, the reading unit 50 is disposed at a position on the downstream side of the image forming unit 30 in the conveyance direction of the medium from an entrance portion for the medium to an exit portion for the medium.

As illustrated in FIG. 16, the standby unit 110, the evacuation unit 120, the both-surface conveyance mechanism. 45, the determination unit 130 and others may be similarly provided on the image forming apparatus 1A including the drum-type conveyance unit 40. Components 151 and 152 illustrated in FIG. 16 correspond to an entrance tray through which a recording medium for image formation enters, and a discharge tray through which the recording medium is discharged, respectively. The evacuation unit 120 evacuates upward at the time of image formation, for example.

According to the example illustrated in FIG. 16, the one entrance tray 151 and the one discharge tray 152 are provided. However, the numbers of these trays are not limited to this number presented only by way of example. For example, a plurality of the entrance trays 151 and a plurality of the discharge trays 152 may be equipped. According to the example illustrated in FIG. 16, the standby unit 110 and the entrance tray 151 are separately provided. However, a single tray functioning both as the standby tray and the entrance tray may be equipped on the entrance side of the medium. According to the example illustrated in FIG. 16, the evacuation unit 120 and the discharge tray 152 are separately provided. However, a single tray functioning both as the evacuation unit and the discharge tray may be equipped on the discharge side of the medium.

Advantageous effects similar to the advantageous effects described above are offered by the image forming apparatus 1A illustrated in FIG. 16 as an example.

It should be understood that the embodiment disclosed herein according to the present invention is presented only by way of example in all aspects, and not intended to limit any points. The scope of the present invention is defined not by the description herein, but by the scope of the appended claims. It is intended that the scope of the present invention includes all modifications made based on equivalent meanings within a scope equivalent to the scope of the appended claims.

For example, the reading unit 50 is not limited to the linear image sensor according to the embodiment described above only by way of example. For example, the reading unit 50 may be a two-dimensional area image sensor so provided as to image a surface of a medium conveyed by the conveyance unit 40.

Moreover, the reading unit 50 is not limited to the reading unit which has the function of generating image data according to the embodiment described above only by way of example. The reading unit 50 may be an arbitrary unit as long as at least color detection is achievable.

The color values and values of brightness for R, G, and B are not limited to 8-bit values (0 to 255) according to the embodiment described above only by way of example, but may be modified in appropriate manners. Furthermore, the color space handled by the reading unit 50 for reading, and parameters such as brightness associated with color recognition may be modified in appropriate manners.

The image forming unit 30 is not limited to the image forming unit which functions as a one-pass type inkjet recording apparatus according to the embodiment described above only by way of example. For example, the image forming unit 30 may further include a mechanism for reciprocating the head units 31 in a predetermined direction, or may form images by image forming methods other than the inkjet recording method.

The correction unit 70 is not limited to the correction unit 70 constituted by circuits independently provided according to the embodiment described above only by way of example. For example, the correction unit 70 may be circuits provided on the reading unit 50. Alternatively, the correction unit 70 may be a function realized by software processing executed by cooperative operations of the CPU, RAM, ROM and others of the control unit 90.

The determination unit 130 is not limited to the determination unit including the detection unit, the output unit, and the related information storage unit according to the embodiment described above only by way of example. For example, the control unit 90 may function as the output unit and the related information storage unit by software processing.

Furthermore, the function of the correction unit 70 may be executed by software processing.

The plurality of reference values set in the reference data D are not limited to values indicating color values after correction as they are as in the embodiment descried by way of example only by way of example. For example, the plurality of reference values set in the reference data D may be correction values added to or subtracted from the before correction value I at the time of calculation of the output value O from the before correction value I. In this case, an addition of the before correction value I (+I) is given in association with calculation of O in Equation (1) noted above.

The method of generating the reference data D is not limited to the method using the respective configurations included in the image forming apparatus 1 according to the embodiment described above only by way of example. For example, the reference data D may be generated by using a dedicated device provided separately from the image forming apparatus 1, or a computer or the like which reads a program and data for generation of the reference data D and executes the program and data.

The present invention is not limited to the image reading device included in the image forming apparatuses 1 and 1A according to the embodiment described above only by way of example, but may be applied to an arbitrary apparatus including configurations associated with reading and writing of images. For example, the present invention is applicable not only to an image reading device provided exclusively for reading of images, but also to an apparatus including various types of functions not limited to formation and reading of images, such as an MFP (Multifunction Peripheral).

The specific configurations of the image forming apparatus 1 according to the embodiment described above may be modified in appropriate manners. For example, when ultraviolet curable ink is used for image formation, a curing unit is disposed on the downstream side of the image forming unit 30 to apply ultraviolet light to a recording medium to which ink has been ejected for curing the ink.

INDUSTRIAL APPLICABILITY

The present invention is applicable to an image reading device which reads a color sample and corrects a reading unit.

REFERENCE SIGNS LIST

1 Image forming apparatus (image reading device)
20 Image processing unit
30 Image forming unit
40 Conveyance unit
45 Both-surface conveyance mechanism
50 Reading unit
60 Storage unit
70 Correction unit
71 First specification unit (first specification means)
72 Second specification unit (second specification means)
73 Third specification unit (third specification means)
74 Acquisition unit (acquisition means)
75 Calculation unit (calculation means)
110 Standby unit
120 Evacuation unit
130 Determination unit D Reference data
Sa, Sb, Sc Color sample medium

The invention claimed is:

1. An image reading device comprising: a conveyance unit that conveys a medium; a reading unit that reads an image formed on the medium conveyed by the conveyance unit; a storage unit that stores data for specifying a color indicated by a reading result obtained from the reading unit; and a correction unit that corrects the data to match a color of the image and the color indicated by the reading result,
wherein the conveyance unit conveys a color sample medium as a medium containing an image of a color region of a predetermined color,
wherein the reading unit reads the image of the color region,
wherein the correction unit corrects the data associated with the predetermined color in accordance with a reading result of the image of the color region obtained from the reading unit,
wherein the reading unit includes a predetermined number of three or more image pickup devices provided in a predetermined direction,
wherein the storage unit stores reference data for each of a plurality of representative image pickup devices of a number smaller than the predetermined number of the predetermined number of image pickup devices, as representative image pickup devices selected from the predetermined number of image pickup devices, the reference data containing a plurality of reference values set individually as values selected within a range of a predetermined number of gradations from a minimum color value to a maximum color value and corresponding to a plurality of representative color values of a number smaller than the predetermined number of gradations, and
wherein the correction unit includes:
a first specification means that specifies an image pickup device corresponding to a correction target in the predetermined number of image pickup devices,
a second specification means that specifies a representative image pickup device corresponding to the image pickup device specified by the first specification means,
a third specification means that specifies a representative color value corresponding to a color value indicated by a reading result obtained from the image pickup device specified by the first specification means,
an acquisition means that acquires, from the storage unit, reference values corresponding to a combination of the representative image pickup device specified by the second specification means and the representative color value specified by the third specification means, and
a calculation means that calculates a correction value corresponding to a value indicated by the reading result obtained from the image pickup device specified by the first specification means in an interpolation process based on the reference values acquired by the acquisition means.

2. The image reading device according to claim 1, wherein
the color sample medium contains images of the color regions of a plurality of colors, and
the correction unit corrects the data associated with the plurality of colors in accordance with reading results of the images of the color regions of the plurality of colors obtained from the reading unit.

3. The image reading device according to claim 2, further comprising a determination unit that determines reading timing for the respective images of the color regions of the plurality of colors contained in the color sample medium conveyed by the conveyance unit, wherein
the reading unit reads the respective images of the color regions of the plurality of colors in accordance with the reading timing determined by the determination unit.

4. The image reading device according to claim 3, wherein
the determination unit determines the reading timing in accordance with a conveyance amount of the color sample medium from a predetermined position on the upstream side of the reading unit in a conveyance direction of the medium conveyed by the conveyance unit.

5. The image reading device according to claim 3, wherein
the images of the color regions of the plurality of colors are formed on both surfaces of the color sample medium, and
the conveyance unit includes a both-surface conveyance mechanism that conveys the medium such that the reading unit reads both the surfaces of the medium.

6. The image reading device according to claim 3, comprising a standby unit that puts the color sample medium on standby before the color sample medium is conveyed by the conveyance unit, wherein
the conveyance unit conveys the color sample medium from the standby unit.

7. The image reading device according to claim 3, comprising an evacuation unit that evacuates the color sample medium conveyed by the conveyance unit, wherein
the conveyance unit conveys the color sample medium read by the reading unit such that the color sample medium evacuates toward the evacuation unit.

8. The image reading device according to claim 2, wherein
the images of the color regions of the plurality of colors are formed on both surfaces of the color sample medium, and
the conveyance unit includes a both-surface conveyance mechanism that conveys the medium such that the reading unit reads both the surfaces of the medium.

9. The image reading device according to claim 2, comprising a standby unit that puts the color sample medium on standby before the color sample medium is conveyed by the conveyance unit, wherein
the conveyance unit conveys the color sample medium from the standby unit.

10. The image reading device according to claim 2, comprising an evacuation unit that evacuates the color sample medium conveyed by the conveyance unit, wherein
the conveyance unit conveys the color sample medium read by the reading unit such that the color sample medium evacuates toward the evacuation unit.

11. The image reading device according to claim 2, wherein
the color sample medium has a thickness sufficient for preventing such a state that the other surface of the color sample medium is seen through one surface of the color sample read by the reading unit.

12. The image reading device according to claim 1, comprising a standby unit that puts the color sample medium on standby before the color sample medium is conveyed by the conveyance unit, wherein
   the conveyance unit conveys the color sample medium from the standby unit.

13. The image reading device according to claim 1, comprising an evacuation unit that evacuates the color sample medium conveyed by the conveyance unit, wherein
   the conveyance unit conveys the color sample medium read by the reading unit such that the color sample medium evacuates toward the evacuation unit.

14. The image reading device according to claim 1, wherein
   the second specification means specifies one representative image pickup device corresponding to the image pickup device specified by the first specification means when the image pickup device specified by the first specification means corresponds to any one of the plurality of representative image pickup devices, and specifies two representative image pickup devices close to the image pickup device specified by the first specification means when the image pickup device specified by the first specification means does not correspond to any one of the plurality of representative image pickup devices, and
   the third specification means specifies one representative color value corresponding to the color value indicated by a reading result obtained from the image pickup device specified by the first specification means when the color value indicated by this reading result corresponds to any one of the plurality of representative color values, and specifies two representative color values close to the color value indicated by the reading result obtained from the image pickup device specified by the first specification means when the color value indicated by this reading result does not correspond to any one of the representative color values.

15. The image reading device according to claim 1, wherein
   the plurality of reference values are set based on values indicated by reading results obtained from the plurality of representative image pickup devices having read a color sample corresponding to the plurality of representative color values of the predetermined color.

16. The image reading device according to claim 1, wherein
   the color sample medium has a thickness sufficient for preventing such a state that the other surface of the color sample medium is seen through one surface of the color sample read by the reading unit.

* * * * *